US012779347B2

(12) United States Patent
McGarvey

(10) Patent No.: US 12,779,347 B2
(45) Date of Patent: Nov. 3, 2026

(54) METHODS AND SYSTEMS FOR GAME PLAY

(71) Applicant: Michael McGarvey, Center Valley, PA (US)

(72) Inventor: Michael McGarvey, Center Valley, PA (US)

( * ) Notice: Subject to any disclaimer, the term of this patent is extended or adjusted under 35 U.S.C. 154(b) by 305 days.

(21) Appl. No.: 18/263,813

(22) PCT Filed: Apr. 15, 2022

(86) PCT No.: PCT/US2022/025047
§ 371 (c)(1),
(2) Date: Aug. 1, 2023

(87) PCT Pub. No.: WO2022/221677
PCT Pub. Date: Oct. 20, 2022

(65) Prior Publication Data

US 2024/0108991 A1 Apr. 4, 2024

Related U.S. Application Data

(60) Provisional application No. 63/175,382, filed on Apr. 15, 2021.

(51) Int. Cl.

| | |
|---|---|
| ***A63F 13/812*** | (2014.01) |
| ***A63F 13/217*** | (2014.01) |
| ***A63F 13/46*** | (2014.01) |
| ***A63F 13/795*** | (2014.01) |

(52) U.S. Cl.
CPC .......... *A63F 13/812* (2014.09); *A63F 13/217* (2014.09); *A63F 13/46* (2014.09); *A63F 13/795* (2014.09)

(58) Field of Classification Search
CPC ...... A63F 13/812; A63F 13/217; A63F 13/46; A63F 13/795
USPC ........................................................ 463/3
See application file for complete search history.

(56) References Cited

U.S. PATENT DOCUMENTS

| | | | | |
|---|---|---|---|---|
| 11,471,774 B2 * | 10/2022 | Tureaud | A63F 13/65 | |
| 2012/0322582 A1 * | 12/2012 | Solheim | A63B 69/36 | 473/131 |
| 2014/0057735 A1 * | 2/2014 | Yu | A63B 53/0466 | 473/409 |
| 2014/0114451 A1 | 4/2014 | Kerr et al. | | |
| 2015/0072796 A1 | 3/2015 | Foley | | |

(Continued)

FOREIGN PATENT DOCUMENTS

WO 2019229748 A1 12/2019

*Primary Examiner* — Michael A Cuff
(74) *Attorney, Agent, or Firm* — Ballard Spahr LLP

(57) ABSTRACT

Methods and systems are described for facilitating gameplay associated with the game of golf. One or more projected scores for one or more players may be determined. The one or more projected scores may reflect a player's ability with respect to the difficulty of a golf course or specific hole. One or more actual scores for the one or more players may be determined. The one or more actual scores and/or one or more projected scores may be adjusted based on condition data such as weather or course conditions associated with a respective golf course. The one or more projected scores, one or more actual scores, and one or more adjustment factors may be sent to a gaming engine for analysis, compared, and a contest winner declared.

20 Claims, 18 Drawing Sheets

(56) References Cited

U.S. PATENT DOCUMENTS

| | | | | |
|---|---|---|---|---|
| 2016/0008694 | A1* | 1/2016 | Griffiths | G01S 19/19 473/409 |
| 2018/0001180 | A1* | 1/2018 | Bharadwaj | A63B 69/36 |
| 2018/0173223 | A1* | 6/2018 | Doane | A63B 55/61 |
| 2018/0200605 | A1* | 7/2018 | Syed | A63B 24/0003 |
| 2022/0296964 | A1* | 9/2022 | Thurner | G06N 3/09 |
| 2024/0245995 | A1* | 7/2024 | Tureaud | G06T 13/40 |

* cited by examiner

400

PLAYER A -PA COURSE HANDICAP = 4

| | | | | | | | | | | |
|---|---|---|---|---|---|---|---|---|---|---|
| COURSE A | | | | | | | | | | |
| HOLE # | 1 | 2 | 3 | 4 | 5 | 6 | 7 | 8 | 9 | IN |
| HANDICAP | 15 | 1 | 17 | 13 | 11 | 9 | 5 | 3 | 7 | |
| PAR | 4 | 4 | 3 | 4 | 4 | 5 | 4 | 4 | 4 | 36 |
| ACTUAL SCORE | 4 | 4 | 3 | 4 | 4 | 6 | 4 | 7 | 4 | 40 |
| SCORE TO PAR | E | E | E | E | E | +1 | E | +3 | E | |
| PLAYER A | AS | +1 | +2 | +3 | +4 | +4 | +4 | +3 | +3 | WINNER+3 |
| | | | | | | | | | | |
| | | | | | | | | | | |
| PLAYER B -NJ COURSE HANDICAP OF 6 (RECEIVING 2 STROKES ON HOLE #4 AND HOLE #1) | | | | | | | | | | |
| COURSE B | | | | | | | | | | |
| HOLE # | 8 | 4 | 6 | 7 | 3 | 2 | 5 | 1 | 9 | IN |
| HANDICAP | 15 | 1 | 17 | 13 | 11 | 9 | 5 | 3 | 7 | |
| PAR | 4 | 4 | 3 | 5 | 5 | 3 | 4 | 4 | 4 | 36 |
| ACTUAL | 4 | 7 | 4 | 6 | 6 | 4 | 4 | 4 | 4 | 43 |
| SCORE TO PAR | E | +3 | +1 | +1 | +1 | +1 | E | E | E | |
| PLAYER B | AS | -1 | -2 | -3 | -4 | -4 | -4 | -3 | -3 | LOSER -3 |

FIG. 4A

401

MATCH REVIEW

PLAYER A

PA COURSE HANDICAP = 4

COURSE A (PENNSYLVANIA)

TOTAL SCORE: 40 | TO PAR: +4

| HOLE | HOLE 1 | HOLE 2 | HOLE 3 | HOLE 4 | HOLE 5 | HOLE 6 | HOLE 7 | HOLE 8 | HOLE 9 | IN |
|---|---|---|---|---|---|---|---|---|---|---|
| HANDICAP | 15 | 1 | 17 | 13 | 11 | 9 | 5 | 3 | 7 | |
| PAR | 4 | 4 | 3 | 4 | 4 | 5 | 4 | 4 | 4 | 36 |
| ACTUAL SCORE | 4 | 4 | 3 | 4 | 4 | 6 | 4 | 7 | 4 | 40 |
| SCORE TO PAR | E | E | E | E | E | +1 | E | +3 | E | |
| MATCH PLAYER A | AS | +1 | +2 | +3 | +4 | +4 | +4 | +3 | +3 | +3 MATCH WINNER |

FIG. 4B

| HOLE | HOLE 8 | HOLE 4 | HOLE 6 | HOLE 7 | HOLE 3 | HOLE 2 | HOLE 5 | HOLE 1 | HOLE 9 | IN |
|---|---|---|---|---|---|---|---|---|---|---|
| HANDICAP | 15 | 1 | 17 | 13 | 11 | 9 | 5 | 3 | 7 | |
| PAR | 4 | 4 | 3 | 5 | 5 | 5 | 4 | 4 | 4 | 36 |
| ACTUAL SCORE | 4 | 7 | 4 | 6 | 6 | 6 | 4 | 4 | 4 | 43 |
| SCORE TO PAR | E | +3 | +1 | +1 | +1 | +1 | E | E | E | |
| MATCH PLAYER B | AS | +1 | -2 | -3 | -4 | -4 | -4 | -3 | -3 | -3 MATCH WINNER |

METHODS AND SYSTEMS FOR GAME PLAY

CROSS-REFERENCE TO RELATED APPLICATIONS

This application is a U.S. National Phase Application of International Application No. PCT/US2022/025047, filed Apr. 15, 2022, which claims priority to U.S. Provisional Application No. 63/175,382, filed Apr. 15, 2021, the entirety of which are incorporated herein by reference in their entirety.

BACKGROUND

Sporting contests are traditionally played by players in close proximity to one another. For instance, in a traditional golf match, all of the participating golfers are typically located on the same golf course, playing the various holes of the course simultaneously (e.g., a group of players on one hole, another group of players on another hole), and under the same conditions (and in sequential order). These traditional contests are limited therefore, to only those participants who can be at a given location at a given time. Therefore, there is a need for improvements to gameplay so as to allow participants (e.g., golfers) to participate in golf games in which they would otherwise not be able to participate due to constraints in time, geographical location, access to the same golf course (e.g., price), or other limiting factors.

SUMMARY

It is to be understood that both the following general description and the following detailed description are exemplary and explanatory only and are not restrictive or intended to be limiting. Methods and systems for game play are described herein. One or more projected scores for one or more players may be determined. The one or more projected scores may reflect a player's ability with respect to the difficulty of a particular course. One or more actual scores for the one or more players may be determined. The one or more actual scores may reflect a realization of game play, for example a number of strokes a player required to complete a round of golf. One or more score adjustments may be made to the one or more actual scores. For example, a score of the one or more actual scores may be adjusted according to one or more adjustment factors. For example, an adjustment factor of the one or more adjustment factors may comprise an environmental factor such as wind or rain. The one or more projected scores, one or more actual scores, and one or more adjustment factors may be sent to a gaming engine for analysis, compared, and a contest winner declared.

This summary is not intended to identify critical or essential features of the disclosure, but merely to summarize certain features and variations thereof. Other details and features will be described in the sections that follow.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 4A is an example of a scoring scheme;

DETAILED DESCRIPTION

Figure 1:
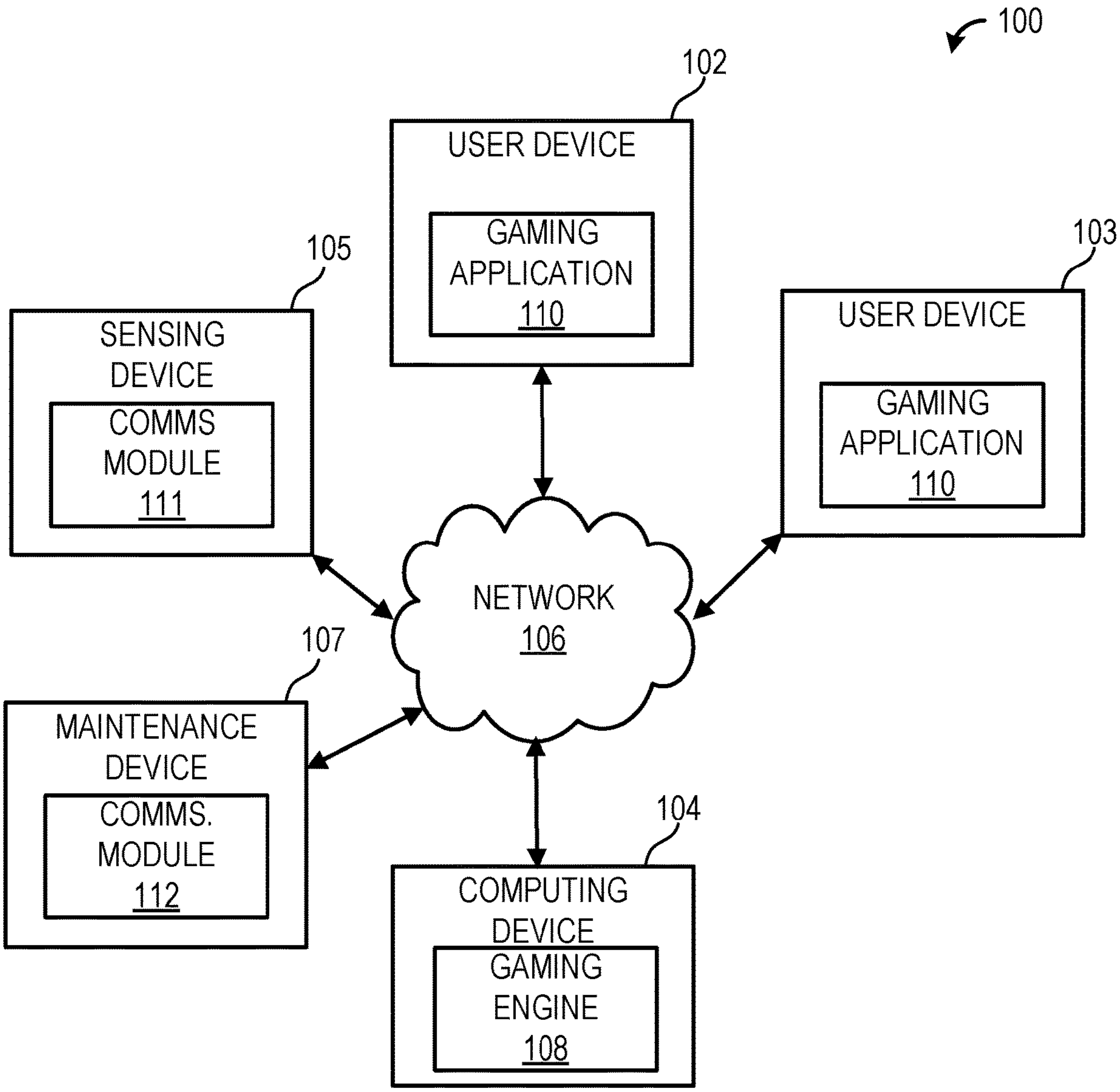
FIG. 1 is a block diagram illustrating an example system.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes, from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as “comprising” and “comprises,” means “including but not limited to,” and is not intended to exclude, for example, other components, integers or steps. “Exemplary” means “an example of” and is not intended to convey an indication of a preferred or ideal embodiment. “Such as” is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is to be understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

FIG. 1 is a block diagram depicting non-limiting examples of a system 100 comprising a first user device 102, a second user device 103, one or more sensing devices 105, one or more maintenance devices 107, and a computing device 104 connected through a network 106. The network 106 may comprise any telecommunications network such as the Internet or a local area network. Other forms of communications can be used such as wired or wireless telecommunication channels, for example. The network 106 may be an optical fiber network, a coaxial cable network, a hybrid fiber-coaxial network, a wireless network, a satellite system, a direct broadcast system, an Ethernet network, a high-definition multimedia interface network, a Universal Serial Bus (USB) network, or any combination thereof. The communication protocols may be universal, generally applicable protocols or they may be game provider specific.

The computing device 104 may be configured to send, receive, generate, store, analyze, or otherwise process data to and/or from any one or more of the devices of FIG. 1. For example, the computing device 104 may send and receive data to and from the one or more user devices 102 and 103 and/or the one or more sensing devices 105. The computing device 104 may comprise a gaming engine 108.

The computing device 104 can comprise one or multiple computers configured to operate the gaming engine 108. The user device 102 can comprise one or multiple computers configured to operate a game application 110 such as, for example, a laptop computer, a desktop computer, a mobile phone (e.g., smartphone), a tablet, and the like. Multiple user devices 102 can connect to the computing device 104 through the network 106 such as, for example, the Internet. A user of the user device 102 may connect to the gaming engine 108 with the game application 110. In an aspect, the gaming engine 108 may be resident within the game application 110. Accordingly, the computing device 104 may be configured to provide updates to the game application 110 and the gaming engine 108 resident within the game application 110.

The gaming engine 108 may be configured to store data and/or content and/or store one or more identifiers. The gaming engine 108 may be configured to send and/or receive data. For example, the gaming engine 108 may be configured to communicate with a computing device, database, combinations thereof, and the like.

For example, the gaming engine 108 may be configured to determine one or more user profiles. The one or more user profiles may comprise any data such as a name, an address, a location, a time, a date, an identifier, or any other information.

The gaming engine 108 may be configured to determine one or more par scores. The one or more par scores may be associated with one or more courses (e.g., golf courses). For example, a first course may be associated with a first par score (e.g., 72). For example, a second course may be associated with a second part score (e.g., 70). For reference, a standard Professional Golfer’s Association (PGA) regulation course is a par 72 course. That is to say, a typical professional golfer could be expected to require 72 strokes to complete a round of golf on a par 72 course. Likewise, a typical professional golfer could be expected to require 70 strokes to complete a round of golf on a par 70 course. In other words, a par 70 course could, due to slope/ratings be considered easier than a par 72 course because the par 70 course is expected to require fewer strokes to complete a round of golf. A handicap differential may also be considered. A Handicap Differential is the difference between a player's adjusted gross score and the USGA Course Rating of the course on which the score was made, multiplied by 113, then divided by the Slope Rating from the tees played and rounded to the nearest tenth, e.g., 12.8. The Handicap Differential is the official reflection of how well the round was played (lower the better) as it accounts for the players score in addition to the difficulty of the course and tee the score was record on (rating & slope values). In a traditional golf match, players are ranked (e.g., compared via course handicap or professional rankings). For example, professionals and the highest level of amateur players typically compete at the same or equal status. However, amateurs use the handicap system to try to level competitive field, and thus contest results decided, by ranking "scores to par." That is to say, if a first player playing a par 72 course shoots a 62 (takes 62 strokes to complete the round and thus scores "ten under par"), while a second player playing the same par 72 course shoots a 68 (takes 68 strokes to complete the round and thus scores "four under par"), the first player would be considered the winner.

For example, the gaming engine 108 may be configured to determine one or more projected scores. The one or more projected scores may be associated with one or more participants (e.g., players or golfers or the like). The one or more projected scores may be associated with a handicap. The one or more projected scores may indicate (e.g., predict) how a given player will perform (e.g., how many strokes to complete a round of golf) on a given golf course. For example, a golf handicap may comprise a numerical measure of a golfer's potential that is used to one or more participants of varying abilities to compete against one another. Better players are generally associated with lower handicaps. For example, a golfer associated with a handicap of 5 is generally regarded to be more skilled than a golfer associated with a handicap of 12. That is to say, in a typical competition, a golfer with a handicap of 5 is granted 5 strokes. In other words, on a par 72 course, the golfer with the handicap of 5 would be expected to require 77 strokes to complete a round of golf (e.g., "shoot" a score of 77), incorporating other considerations such as slope/ratings of the course. The golfer with a handicap of 12, on the other, while playing the same course, would be expected to shoot a score of 84. The gaming engine 108 may be configured to determine a player's handicap by, for example, accessing a database, or receiving a user input.

The gaming engine 108 may be configured to determine one or more actual scores. For example, the gaming engine 108 may be configured to receive a user input (e.g., a number of stokes on a given hole or course during a round of golf), and store the input. For example, during the course of play, a player may enter a number of strokes the player took to complete a hole or round. The one or more actual scores may represent the number of strokes a given player required to actually complete the round of golf.

The gaming engine 108 may be configured to determine a game play mode. As described with further detail herein, the gaming engine 108 may be configured to facilitate, for example, a head-to-head style gameplay or a team style gameplay. Other game modes are contemplated including at least: match play, stroke play, skins, stableford, multiplayer games, scramble, better ball, league play, combinations thereof, and the like.

The gaming engine 108 may be configured to determine one or more aggregate scores associated with the one or more players. For example, if a first player is projected to shoot 77, and in reality shoots 80, that player's aggregate score may be +3. That is to say, that player took three shots more than expected to complete the round. The aggregate score may or may not be the same as the projected score.

The gaming engine 108 may receive, from the one or more sensing devices 105, condition data. The aforementioned are merely exemplary and explanatory and it is to be appreciated that any sensors may be incorporated into the system 100. The one or more sensing devices 106 may be configured to determine (e.g., measure, gather, retrieve) the condition data. The one or more sensing devices may comprise one or more communications modules 111 configured to send and receive data gathered by the one or more sensing devices 105. The one or more communications modules may be configured to communicate with one or more of the user devices and/or the computing device 104 via the network 106. The condition data may comprise environmental factors like the weather, soil conditions, maintenance and repair and any other condition that may impact play on given golf course. The one or more sensing devices 106 may comprise any sensing devices (e.g., sensors). For example, the one or more sensing devices 106 may comprise one or more temperature sensors, one or more precipitation sensors, one or more pressure sensors, one or more light sensors, one or more wind sensors, one or more soil sensors, one or more solar radiation sensors, one or more visibility sensors, one or more ground tremor sensors, combinations thereof, and the like.

For example, the score of a player who played in temperatures above 90 degrees may have one stroke deducted while the score of a player who played in an ideal temperature of 70 degrees have no strokes deducted and the score of a player who played in thirty degrees may have two strokes deducted.

The conditions may include recent maintenance and other similar activities (e.g., whether the greens have been recently aerated, etc.) physical parameters of the course such as the firmness of a green, pin placement, the speed of a green ("stimp"), height of the "rough," height of the "fringe," bounce, spin, consistency, Trufirm, or other course factors. For example, the score of a player who played a course whose greens have been aerated in the last 48 hours may be awarded a stroke. For example, the one or maintenance devices 107 may comprise one or more maintenance computing devices configured to store one or more maintenance records associated with one or more golf courses. The one or more maintenance computing devices 107 may comprise one or more communications modules 112. The computing device 104 may be configured to query the one or more maintenance computing devices. For example, if a first player submits a first score associated with a first course, the computing device 104 may determine whether or not a first maintenance record associated with the first course is available. The first maintenance record may indicate the greens at the first course were recently aerated. Thus, the score of a player who played at the first course may be adjusted (e.g., one or more strokes deducted) to compensate for the increased difficulty of putting on aerated greens.

The gaming engine 108 may be configured to determine one or more adjustment factors based on the condition data received by from the one or more sensing devices 105. The one or more adjustment factors may be associated with, for example, environmental factors such as wind, rain or other precipitation, temperature, sunlight, time of day, combinations thereof, and the like. For example, the gaming engine 108 may be configured to adjust a score (e.g., one or more of projected score, actual score, score to par, etc. . . . ) according to the one or more adjustment factors. The computing device 104 may be configured to store one or more tables indicating the adjustment factors associated with the environmental factors. For example, wind speeds between 0-9 mph may be worth one stroke while winds speeds from 10-19 may be worth strokes and winds over 30 pmh may be worth 5 strokes. That is to say, the score of the player associated with the environmental factor may be adjusted according to the adjustment factor (e.g., reduced by some number of strokes as the difficulty of conditions increase).

For example, the player that was projected to shoot 77, who in reality shot 80, also played the round in winds of 20 miles per hour ("mph"), may be awarded a point (e.g., a stroke may be deducted from the actual score) for the increased difficult associated with high wind speeds. As such, that player's total score may be calculated as 80−77−1=2. Thus, that player's totals score may be +2. The aforementioned is merely exemplary and should not be construed as limiting. It is to be appreciated that any environmental factor may be an adjustment factor and any score adjustment may be implemented.

The gaming engine 108 may be configured to compare the one or more total scores, and thereby determine one or more contest results (e.g., determine a winner).

Figure 2:
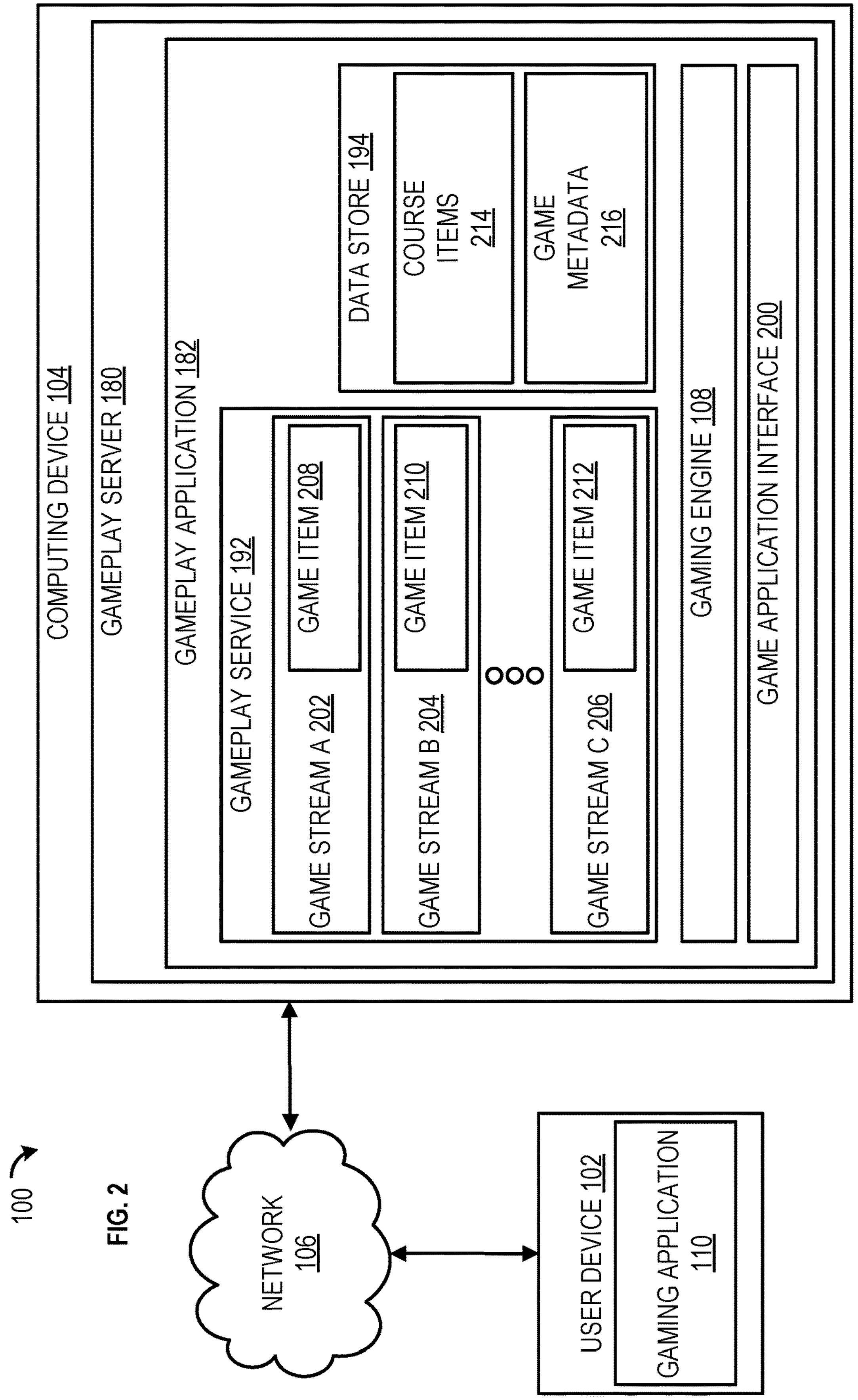
FIG. 2 is a block diagram illustrating an example system.

FIG. 2 is a schematic illustration of the system 100 for facilitating execution of the gameplay described herein. The system 100 includes the user device 102, the computing device 104, and network 106.

The user device 102 operates to send, receive, and/or store data so as to facilitate execution of the gameplay described herein. In some embodiments, the user device 102 operates to play game items that are provided (e.g., streamed, transmitted, etc.) by a system external to the user device 102 such as the computing device 104, another system, or a peer device. Alternatively, in some embodiments, the user device 102 operates to play game items stored locally on the user device 102. Further, in at least some embodiments, the user device 102 operates to play game items that are stored locally as well as game items provided by a system external to the media-playback device 102.

The user device 102 operates to play game items to produce gaming output. In some embodiments, the game items are provided by the computing device 104 and transmitted to the user device 102 using the network 106. A game item is an item of game content, including audio, video, or other types of media content, which may be stored in any format suitable for storing media content. Non-limiting examples of game items include scores, courses, player profiles, audio or video content, and portions or combinations thereof, and the like.

In some embodiments, the user device 102 is a computing device, handheld entertainment device, smartphone, tablet, watch, wearable device, or any other type of device capable of sending, receiving, and/or storing data. In yet other embodiments, the user device 102 is a laptop computer, desktop computer, television, gaming console, set-top box, network appliance, media player, stereo, or radio.

The user device 102 operates to store data and instructions. In some embodiments, the user device 102 stores instructions for a gaming application 110. In some embodiments, the gaming application 110 operates to enable a competition between two or more players of game items. The gaming application 110 may be configured to interface with the gameplay server 180 through the game application interface 200 in order to send and/or receive data to/from the gaming engine 108.

The network access device 162 operates to communicate with other computing devices over one or more networks, such as the network 106. Examples of the network access device include wired network interfaces and wireless network interfaces. Wireless network interfaces includes infrared, BLUETOOTH wireless technology, 802.11 a/b/g/n/ac, and cellular or other radio frequency interfaces in at least some possible embodiments.

The network 106 is an electronic communication network that facilitates communication between the user device 102 and the computing device 104. An electronic communication network includes a set of computing devices and links between the computing devices. The computing devices in the network use the links to enable communication among the computing devices in the network. The network 106 can include routers, switches, mobile access points, bridges, hubs, intrusion detection devices, storage devices, standalone server devices, blade server devices, sensors, desktop computers, firewall devices, laptop computers, handheld computers, mobile telephones, and other types of computing devices.

In various embodiments, the network 106 includes various types of links. For example, the network 106 can include wired and/or wireless links, including BLUETOOTH, ultra-wideband (UWB), 802.11/b/g/n/ac, ZIGBEE, cellular, and other types of wireless links. Furthermore, in various embodiments, the network 106 is implemented at various scales. For example, the network 106 can be implemented as one or more local area networks (LANs), metropolitan area networks, subnets, wide area networks (such as the Internet), or can be implemented at another scale. Further, in some embodiments, the network 106 includes multiple networks, which may be of the same type or of multiple different types.

The computing device 104 comprises one or more computing devices and operates to provide game items to the user devices 102 and, in some embodiments, other devices as well. The computing device 104 includes a gameplay server 180. In at least some embodiments, the gameplay server 180 is provided by multiple computing devices. For example, the gameplay server 180 may be provided by multiple redundant servers located in multiple geographic locations. As an additional example, the various functions of the gameplay server 180 may be provided by multiple heterogeneous servers.

The gameplay server 180 operates to send/receive game items to/from the user devices such as the user device 102. In some embodiments, the gameplay server 180 includes a gameplay application 182. In some embodiments, the gameplay application 182 operates to game data or other audio, video, or other forms of media content. The gameplay application 182 includes a gameplay service 192, a data store 194, a game engine 108, and a game application interface 200.

In some embodiments, multiple servers provide various components of the gameplay application 182. For example, in some embodiments, separate heterogeneous servers operate to provide each of the gameplay service 192, the data store 194, the game engine 108, and the game application interface 200.

The gameplay service 192 operates to store data such as game items 208, 210, and 212 for streaming to one or more game streams 202, 204, and 206. The one or more games streams 202, 204, and 206 may comprise real-time gameplay information associated with, for example, the one or more participants in the contest. For example, the game stream 202 may be associated with a first golfer, the game stream 204 may be associated with a second golfer, and the game stream 206 may be associated with a third golfer. For example, during the course of playing a round of golf, the first golfer may log her score on a given hole (e.g., game item 208). Via the game stream 202, she may send her score to the computing device 104. The game item 208 may not be limited to a score. For example, the game item 208 may comprise location information or pace of play information as well. The aforementioned example is not intended to be limiting and one skilled in the art will appreciate that either or both of any of the game streams or game items may comprise any information.

In some embodiments, the data store 194 stores game items 214, game metadata 216, and playlists 218. The data store 194 may comprise one or more databases and file systems. Other embodiments are possible as well. As noted above, the game items 214 may be scores, profiles, other game related data, audio, video, or any other type of media content, which may be stored in any format.

The game metadata 216 operates to provide various information associated with the game items 214. In some embodiments, the game metadata 216 may include such information as weather or other environmental conditions, location information, timing information, user profiles, scores, course information, combinations thereof and the like.

The gaming engine 108 operates to retrieve and/or determine one or more characteristics for game items 214, generate a competition profile for game items 214, and compare two or more game items 214 by comparing the competition profiles associated with each of the two or more game items 214. Aspects of the gaming engine 108 are illustrated and described with respect to FIG. 3.

The game application interface 200 can receive requests or other communication from user devices 102 or other systems, to retrieve game items from the gameplay server 180.

Each of the user device 102 and the computing device 104 can include additional physical computer or hardware resources. In at least some embodiments, the media-playback device 102 communicates with the computing device 104 via the network 106.

Although in FIG. 2 only a single user device 102 and computing device 104 are shown, in accordance with some embodiments, the media-delivery system 104 can support the simultaneous use of multiple media-playback devices, and the media-playback device can simultaneously access media content from multiple media-delivery systems.

In at least some embodiments, the computing device 104 can be used to stream, progressively download, or otherwise communicate data, or other forms of game items to the user device 102 based on a request from the user device 102 to retrieve or game data.

Figure 3:
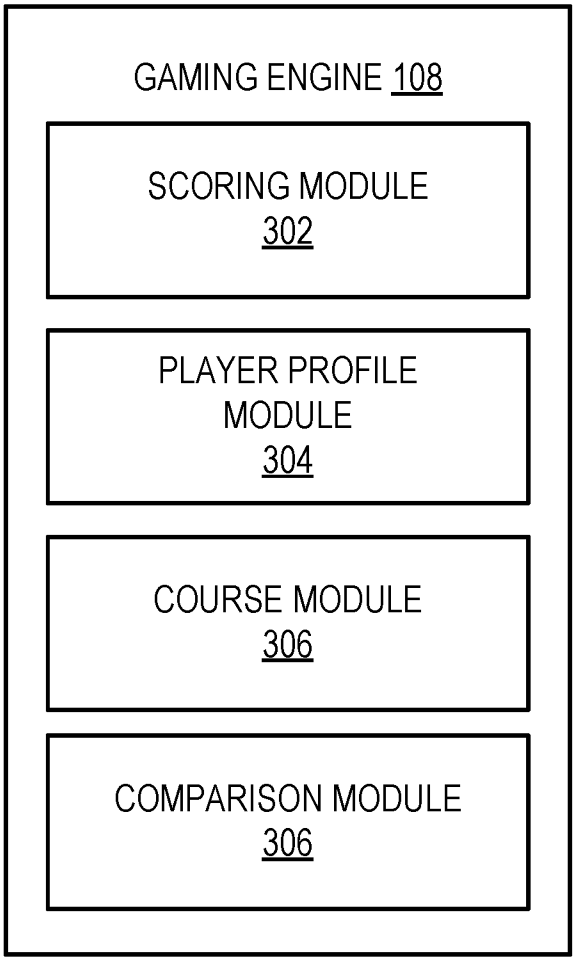
FIG. 3 is a block diagram illustrating an example gaming engine.

FIG. 3 is a block diagram depicting an example view of the gaming engine 108. The gaming engine 108 can comprise one or more of, a scoring module 302, a player profile module 304, and a comparison module 306. The scoring module 302 may receive/retrieve one or more scores. For example, a user may enter a score for a given hole or round of golf. Accordingly, the scoring module 302 may obtain such one or more scores and store the one or more scores as game metadata 216 in the data store 194. The scoring module may also store scoring information such as handicap hole information. For example, on a traditional golf course, the holes are ranked in terms of difficulty. For example, on an 18 hole golf course, the 18 holes will be ranked in difficulty from 1 through 18 with the hole associated with the 1 ranking being the most difficult hole on the course and the hole with the 18 ranking being the easiest hole on the course. Traditionally, when playing a match, the golfer with the higher handicap (e.g., the worse golfer) receives handicap strokes equal to the difference between his handicap and that of his opponent (e.g., the golfer with the higher handicap or the better golfer). For example, a player with a handicap of 12 receives seven shots from a player with a handicap of five. The players then consult the course scorecard to determine the first seven handicap holes (e.g., holes with the handicap rankings 1 through 7). A player with an 18 handicap, for example, receives one handicap stroke on each hole. But a player with a 9 handicap only receives a stroke on holes with handicap ratings of 1 through 9, while a scratch golfer doesn't receive any handicap strokes. Under the USGA handicap system, course officials study the scores posted by low- and high-handicap players when determining how to rate each hole of a course. For example, a player receiving a shot on the first handicap hole may get it on the front nine and the second hole may fall on the back nine, and so on (e.g., every course has odds and evens, and thus, for example course A front 9 could have odd handicaps 1-17 and course A back nine could have even handicaps 2-18, or vice versa.) It is possible for a player to be awarded multiple strokes on a handicap hole. For example, if a player with a handicap of six is paired with a player with a handicap of 25, the difference is 19 strokes. Therefore, the higher-handicap player would receive one stroke on 17 holes and two strokes on the hole on the course with the No. 1 handicap rating. When assigning handicap strokes for a round, the players simply must remove the difference in handicap from the score of the player with the higher handicap. During match play or skins, where scores on each hole are compared, the stroke index comes into play. If, for example, a player is receiving seven strokes from her opponent, she would only receive a stroke off her score on holes with a stroke index of seven or lower.

In an embodiment, the player profile module 304 may be provided with login credentials for an account with a third party system. The player profile module 304 may automatically log in to the third party system using the login credentials and retrieve a token. The player profile module 304 may then use the token to fetch one or more profiles of one or more specific players according to an identifier associated with the one or more players. For example, the player profile module 304 may store information related to a player's playing history such, for example, a handicap. For reference, a handicap is typically established by playing a number (e.g., between 5 and 20) regulation golf rounds. The player profile module 304 may store one or more scores associated with a player's 20 most recent rounds and determine the best 8 scores of the one or more scores associated with the player's 20 most recent rounds. The player profile module 304 may store historical information such as scores from previous rounds played on one or more courses. The player profile module 304 may store historical information such as weather conditions associated with one or more historical rounds. The player profile module 304 may store historical information such as club selection information associated with one or more historical rounds.

The course module 306 may be configured to send, receive, and/or store data to and from the scoring module. For example, the course module 306 may store information related to course length, hole length, course difficulty, slope rating, tee positions, pin positions, hazard locations, maps, course locations, combinations thereof, and the like.

FIG. 4A shows an example scoring scheme 400. While the example scoring scheme 400 shows two players playing 9 holes each, it is to be understood that the scoring scheme 400, as well as the methods and systems described herein may be implemented to incorporate any number of participants and any number of golf holes. The scoring scheme 400 is an example of what may be displayed during the course of a competition or contest between participants. For example, the scoring scheme 400 may comprise a player designation such as "Player A" or "Player B" or a name or number or any other identifier. The scoring scheme 400 may comprise handicap information indicating, for example, that on PA Course, Player A is a 4 handicap or that on NJ Course, Player B is a 6 handicap. The scoring scheme 400 may comprise information related to one or more golf courses. For example, the scoring scheme 400 may indicate that Course A is located in Pennsylvania while Course B is located in New Jersey. The scoring scheme 400 may comprise a hole identifier indicating a golf hole. The hole identifier may comprise a number, for example, as is seen in FIG. 4, holes 1 through 9 are indicated. The scoring scheme 400 may comprise information related to one or more handicapped holes. For example, scoring scheme 400 indicates that on Course A in Pennsylvania, hole 2 is the #1 handicap (the hardest hole on the course), while hole 3 on Course A is the #17 handicapped hole (e.g., the second easiest hole on the course). Similarly, for Course B in New Jersey, the scoring scheme 400 indicates that hole 4 is the #1 handicap while hole 6 is the #17 handicap. Thus, scoring scheme 400 facilitates a comparison between scores shot on different holes at different courses by associating corresponding hole handicaps. The scoring scheme 400 may comprise information related to the hole par and/or course par. As is known in the art, a standard par 72 golf course is expected to require 72 shots to complete a round of golf on the course. The 72 shots (or "strokes") are typically divided among 18 holes. Some of the holes are shorter par 3s (expected to be completed in 3 strokes), medium length par 4s (expected to be completed in 4 strokes), and longer par 5s (expected to be completed in 5 strokes). For example, a standard par 72 course may comprise four par 3s, ten par 4s, and four par 5s. As can be seen in FIG. 4, Course A in Pennsylvania has, through 9 holes, seven par 4s, one par 3, and one par 5. Likewise, Course B in New Jersey has, through 9 holes, five par 4s, two par 3s, and two par 5s.

The scoring scheme 400 may comprise information related to the hole par and/or course par. As is known in the art, a standard par 72 golf course is expected to require 72 shots to complete a round of golf on the course. The 72 shots (or "strokes") are typically divided among 18 holes. Some of the holes are shorter par 3s (expected to be completed in 3 strokes), medium length par 4s (expected to be completed in 4 strokes), and longer par 5s (expected to be completed in 5 strokes). For example, a standard par 72 course may comprise four par 3s, ten par 4s, and four par 5s. As can be seen in FIG. 4, Course A in Pennsylvania has, through 9 holes, seven par 4s, one par 3, and one par 5. Likewise, Course B in New Jersey has, through 9 holes, five par 4s, two par 3s, and two par 5s.

The scoring scheme 400 may comprise scoring information such as an "actual score." The actual score may indicate the number of strokes a given player took while completing the hole. For example, on hole #6 of Course A, Player A took 6 strokes to complete a par 5 hole. That is to say, on hole #6 of Course A, Player A was +1 (e.g., "one over par"). As such, by comparing the "par" to the "actual score," a "score to par" may be determined. The score to par may be associated with the handicap differential. The scoring scheme 400 may comprise the "score to par" of the one or more participants. While the score to par may be calculated for a given hole, repeating the process for every hole in the round yields a total score to par. By comparing the total score to par for each player in a given round, and then taking into account handicaps, a winner may be determined. For example, and as can be seen in scoring scheme 400, Player A won the contest with an actual score of 4 over par while player B lost the contest with an actual score of 7 over par. In a Match-Play scenario, when comparing Player A to Player B during competition, the actual score for each participant may be compared to their respective projected score based on a participants' adjusted handicap comparison. For example in scoring scheme 400, Player B would be projected to score 5 strokes on Hole #1 and 4 strokes on Hole #3, and par on the remaining 7 holes. Any score lower (better than projected), on par, or higher (worse than projected) per hole, would be compared to a difference between Player A's equivalent Actual Score and Projected Score on the corresponding handicaps assigned to the holes they are playing. In a stroke play match using scoring scheme 400 as an example; Player A's actual score would have to equal 40 to play to par (e.g., even). Player B's actual score would have to equal 42 to play to par. In this example, Player A played to par and Player B played+1 with an actual score of 43. In a match play game, the color code of green (win), tan (tie), red (loss) indicates how the participants faired against each other on each hole based on comparing actual score to projected score on respective holes with matching handicaps. Thus, Player A wins+3, and Player B loses –3.

Figure 4B:
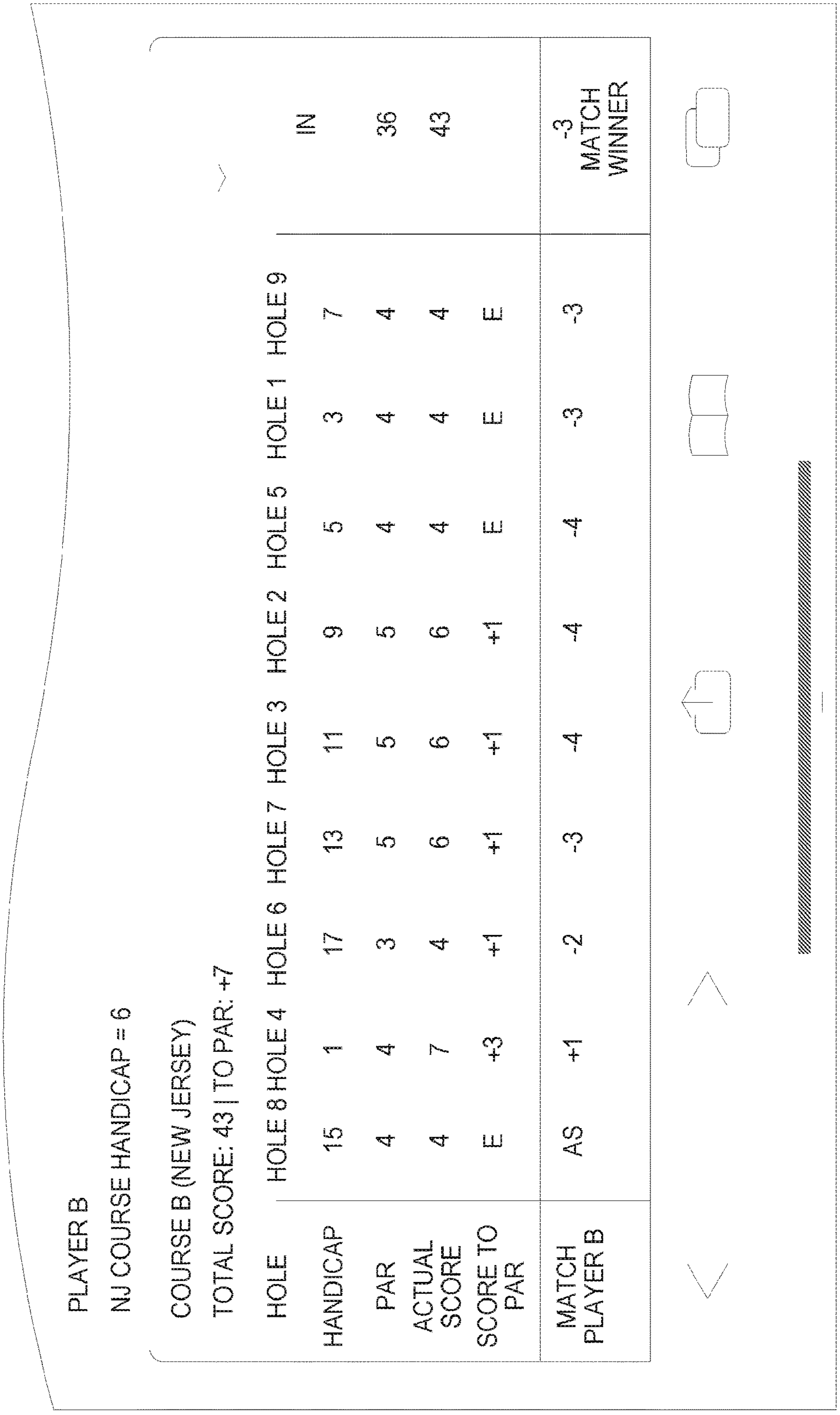
FIG. 4B is an example of a match review.

FIG. 4B shows an example match review 401. The match review 401 may comprise a match review associated with a first player and a match review associated with a second player. While first and second players are recited, a person skilled in the art will appreciate that any number of players may participate and thus, the match review and any other aspect of the methods and systems disclosed herein contemplate one or more players (e.g., a plurality of players). The match review 401 may comprise information such as one or more player names, one or more course names, one or more course locations, one or more total scores, one or more scores to par, one or more handicaps, and various other information as seen in FIG. 4B.

Figure 5B:
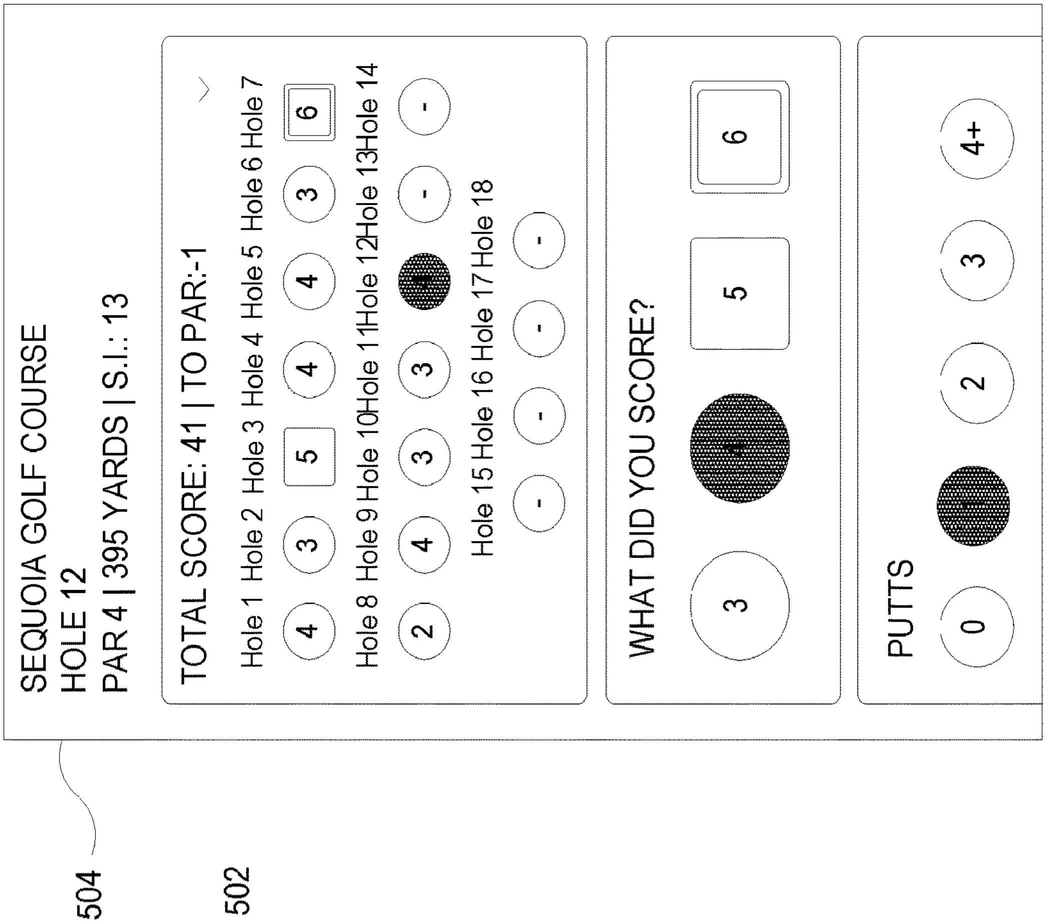
FIG. 5B is an example of an embodiment of a user interface.
Figure 5A:
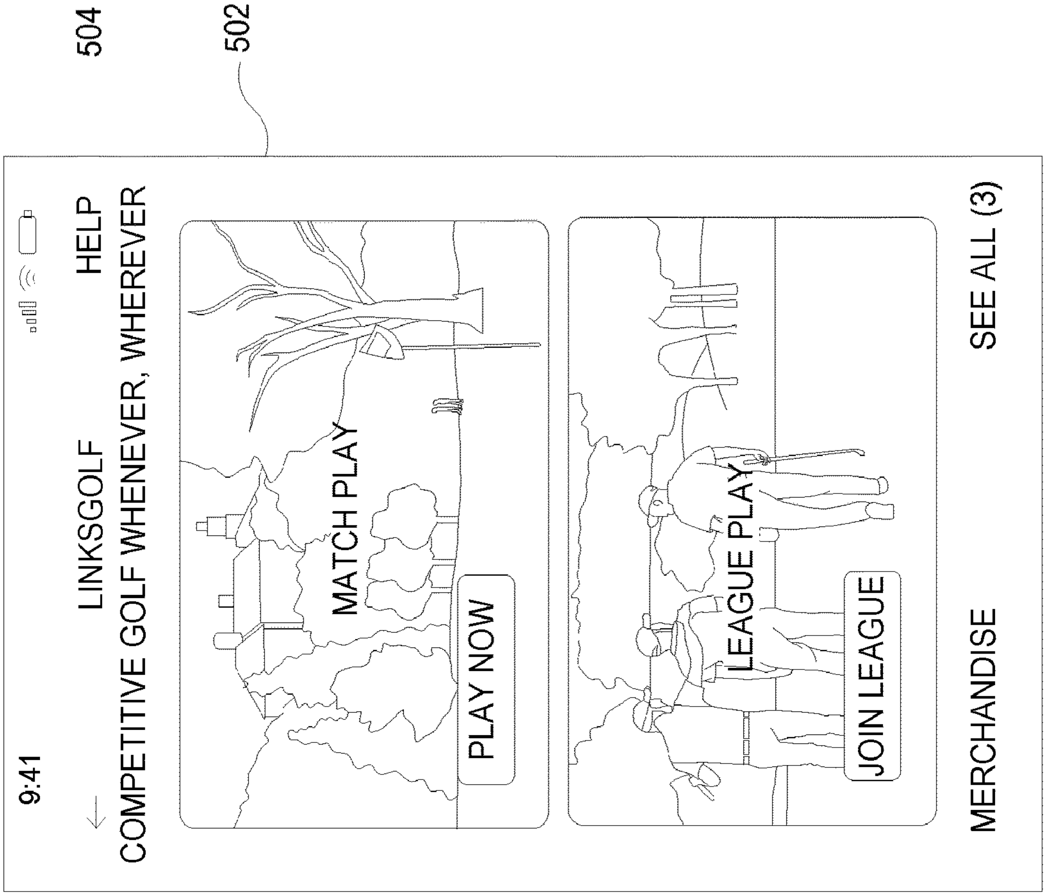
FIG. 5A is an example of an embodiment of a user interface.

FIG. 5A shows an example interface 500 for the gaming application 110 resident on the user device 102. The example interface may facilitate a selection of a game mode. For example, as can be seen in FIG. 5A, a user may select, among other game modes, match play or league play. Additional game modes may include but are not limited to: match play, stroke play, skins, stableford, multiplayer games, scramble, better ball, league play, combinations thereof, and the like.

For example, during a quota game, the scorecard of Player A and Player B on their respective Golf Courses (A and B) may be displayed. The methods and systems described herein may take into consideration their respective golf course handicaps (+10 on A, +15 on B) and display a projected score to par on every hole that the users will be playing. Once the users type in their actual score on each hole, the methods and systems will determine which user outperformed the competition via the difference between each user's actual score to par and each user's projected score to par on every hole. At the end of the 18 hole match, the methods and systems may determine the winner by pegging Golfer A's performance on Golf Course A, to Golfer B's performance on Golf Course B relative to their respective +10 and +15 to par.

For example, example, during match play, the above criteria may be incorporated to level the players' abilities via course handicaps. There may be a normalizing function that will pair the course's holes by difficulty against one another. Since every course has a hole handicap of 1 thru 18, matching handicap 1 on Course A to handicap 1 on Course B and so forth through all 18 holes facilitates the normalization of scores between players. The methods and systems may automate that information and display a scorecard to reflect the paired Handicapped (1-18 toughest holes in sequential order matching Course A's 1-18 to Course B's 1-18) holes for the match play. Once the scorecard is set, play can begin. Actual scores may be submitted by all users in their respective real time (or after the competition of a round of play) and compared to the scores of their competitors on the respective paired handicap at all respective courses being played. Performance to par by each competitor will determine the winner per hole, and thus throughout the match, to determine a winner of the entire 9 hole or 18 hole match. Unlike traditional golf competition, it will not be a comparison of hole #1 on Course A vs Hole #1 on Course B, but rather hole x with a handicap of 1 on Course A vs hole y with a handicap of 1 on Course B and so forth. When comparing Player A to Player B during competition, the actual score for each participant is compared to their respective projected score to par based of the participants' adjusted handicap comparison. For example in scoring scheme 400, Player B would be projected to score 5 strokes on Hole #1 and 4 strokes on Hole #3, and par on the remaining 7 holes. Any score lower (better than projected), on par, or higher (worse than projected) per hole, would be compared to Player A's equivalent Actual Score vs Projected Score difference on the corresponding handicaps assigned to the holes they are playing. In a stroke play match using scoring scheme 400 as an example. Player A's actual score would have to equal 40 to play to par. Player B's actual score would have to equal 42 to play to par. In this example, Player A played even to par and Player B played+1 to par with an actual score of 43. In a match play game, the color code of green (win), tan (tie), red (loss) indicates how the participants faired against each other on each hole based on comparing actual score to projected score on respective holes with matching handicaps. Thus, Player A wins+3, and Player B loses −3.

For example, during stroke play, utilizing Golfer A's course handicap on Course A and may be associated with (e.g., "paired against" or "pinned against") Golfer B's course handicap on course B. Once those numbers are determined via certified handicaps (e.g., USGA Handicap Index, and/or the application's handicap function), a level playing field can be set. i.e. Player A's Course A Handicap is 10, Player B's Course B handicap is 15, Player B is granted five strokes at Course B to level the competitive field against Player A on Course A. The winner of the stroke play game is determined by score to par over the entire round of golf from Player A vs Player B with Player B's score being net −5 like a normal stroke play game would be. When comparing Player A to Player B during competition, the actual score for each participant is compared to their respective projected score based of the participants' adjusted handicap comparison. For example in 400, Player B would be projected to score 5 strokes on Hole #1 and 4 strokes on Hole #3, and par on the remaining 7 holes. Any score lower (better than projected), on par, or higher (worse than projected) per hole, would be compared to Player A's equivalent Actual Score vs Projected Score difference on the corresponding handicaps assigned to the holes they are playing. In a stroke play match using 400 as an example. Player A's actual score would have to equal 40 to play to par. Player B's actual score would have to equal 42 to play to par. In this example, Player A played even to par and Player B played+1 to par with an actual score of 43. Thus, Player A wins E (even), and Player B loses+1.

For example, during skins play, the same method from Match play is applied to normalize the competition. Then the low score adjusting to handicap of the competitors on the paired up handicapped holes at respective courses will determine who wins a "skin" and is then accumulatively applied to the 9 hole or 18 hole match.

For example, during stableford game mode, the application's normalizing function is again used to level playing fields and match up the competitive holes at the respective courses. An accumulative point system (points awarded for Eagle, Birdie, Par, Bogie, and so forth) per hole for each player is applied and totaled throughout the round to determine a winner at the end of the 9 or 18 hole match.

For example, during a scramble game mode, teams of up to 4 at Course A can compete with teams of up to 4 at Courses A-Z (this is a great function for charitable outings, corporate events, tournaments, etc).

For example, during a better ball game mode, teams can be made up of unlimited numbers of players at unlimited numbers of courses because of the normalizing functions of the application. Once the teams are set and competitive playing fields are leveled, standard Better Ball rules apply. Likewise, in a team skins, stroke play, and/or other team matches, once the teams are set and competitive playing fields are leveled, standard rules apply. Such games can be played at a single course or on an infinite number of courses/locations in a single game.

For example, during match game mode or league game mode, the methods and systems provided herein have the ability for users to create private (invite only) or public (open to any player) matches. The user may set the parameters of the match (date range, talent level (based on handicap range), geographical range (if open to the public), and the amount of holes to be played whether a 9 or 18 hole match), and can invite privately or open it up publicly to play a single match versus competitors in varying locations while playing varying courses. It also allows users to set up Leagues (privately or publicly) that can be played weekly, biweekly, or bound by a total amount of rounds in a given date range to fulfill a 'season'. This function allows users at different golf courses to play in a single golf league against competitors they would not typically be able to play consistently because of difficulties in daily schedules, access to particular courses, geographical restrictions, or limitations in group gatherings outside of people's control (e.g., due to COVID travel restrictions or other limitations).

FIG. 5B shows an example interface 502 for the gaming application 110 resident on the user device 102. The interface may display values or scores associated with at least one characteristic of the selected content item. For example, via the example interface 502, a user may enter a score, a total score, a score to par, combinations thereof, and the like.

Figure 6A:
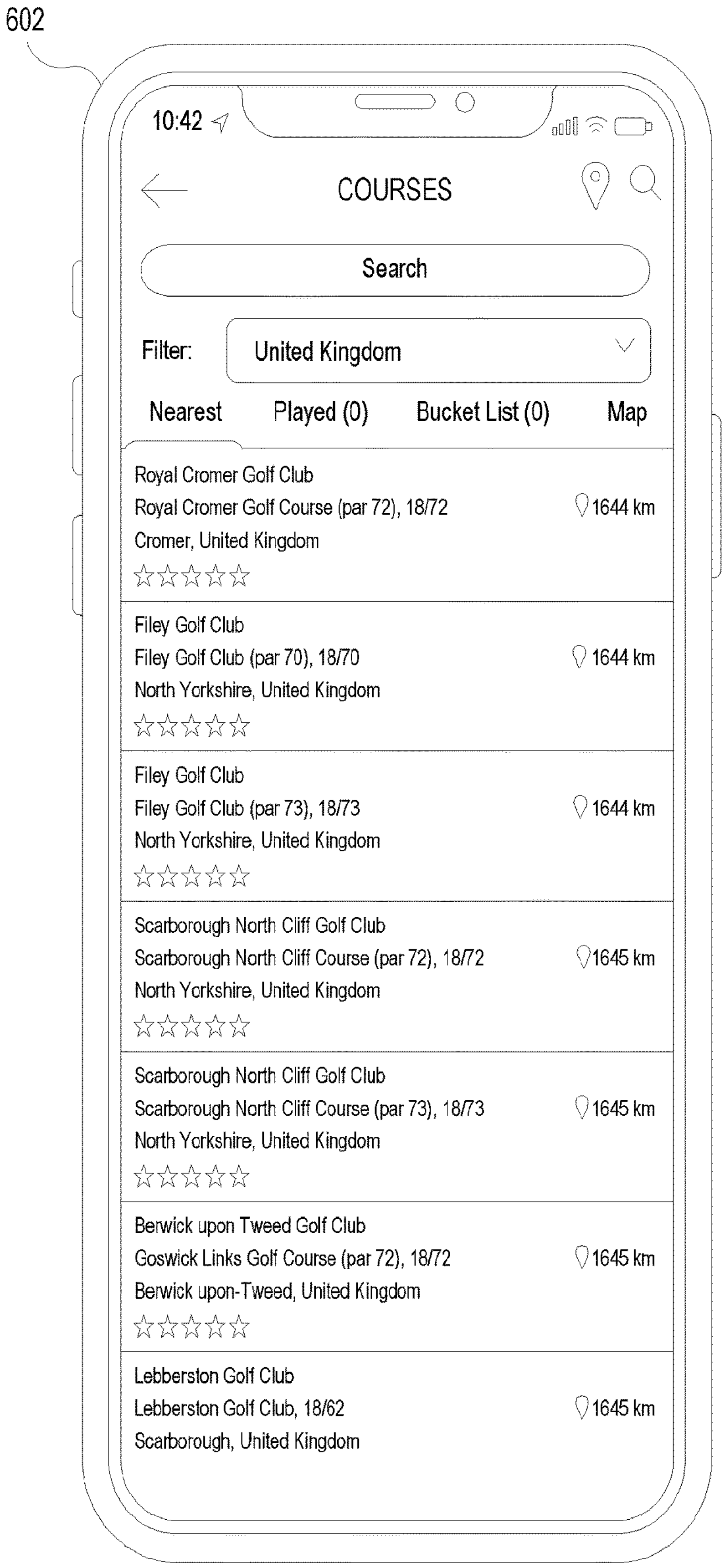
FIG. 6A is an example of an embodiment of a user interface.

FIG. 6A shows an example interface 600 for the gaming application 110 resident on the user device 102. For example, the interface 600 may display course information. The course information may comprise a course name, a course rating, a distance to the course form a user's present location (e.g., the location of the mobile device).

Figure 6B:
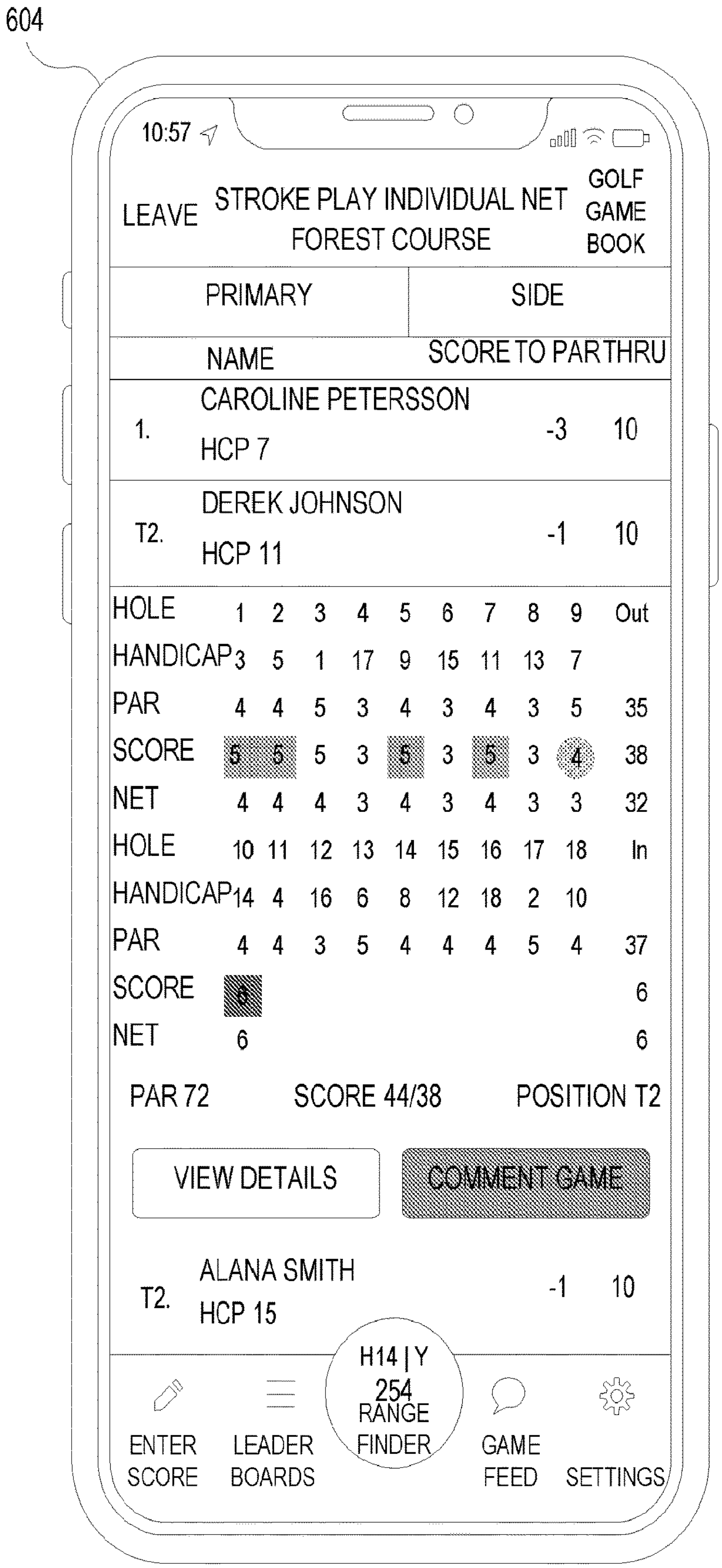
FIG. 6B is an example of an embodiment of a user interface.

FIG. 6B shows an example interface 602 for the gaming application 110 resident on the user device 102. For example, the interface 602 may display play information such as a player name. Further, the interface 602 may display scoring information such as a score, a total score, a score to par, combinations thereof, and the like. For example, the interface 602 may display a scorecard or any other information related to the round of golf.

Figure 6C:
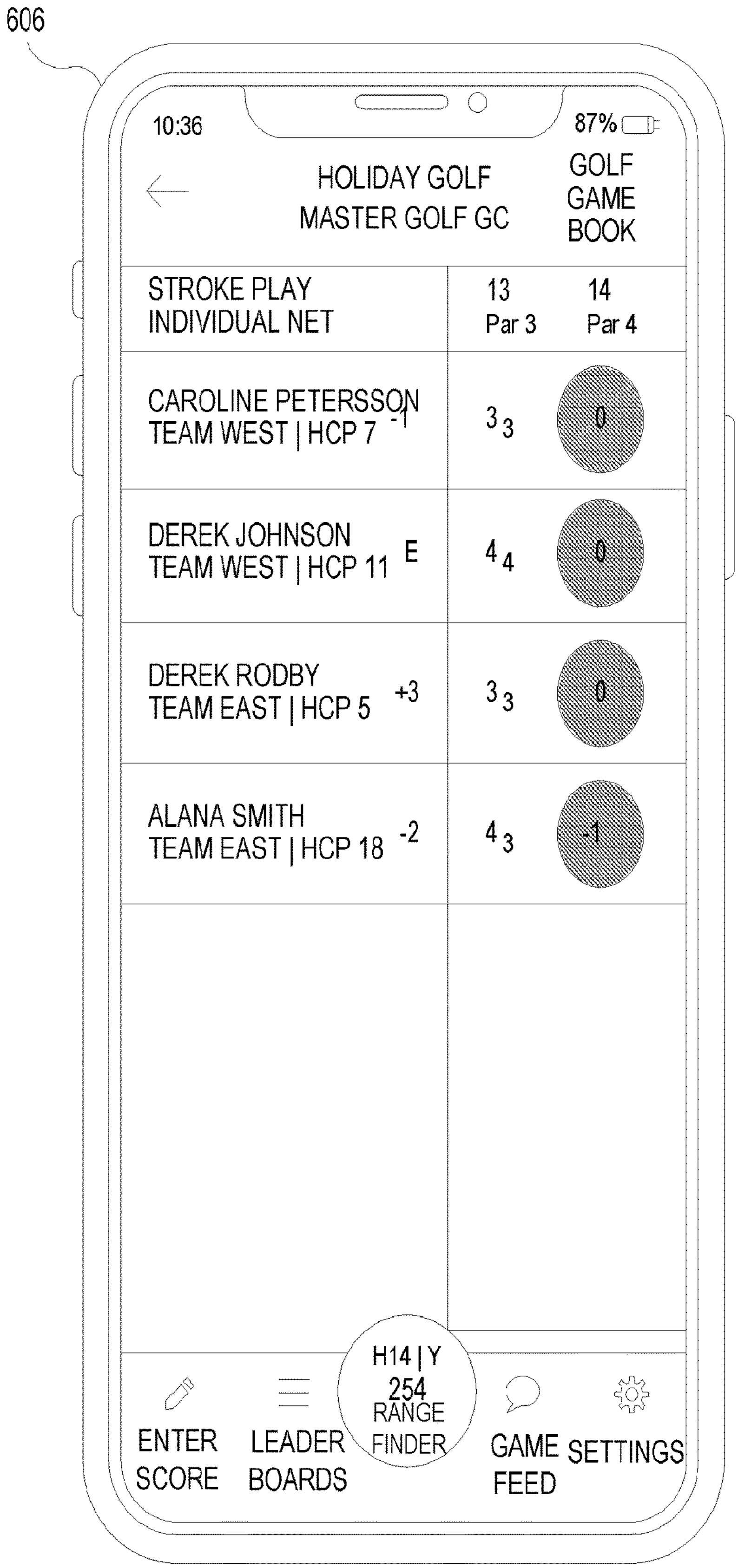
FIG. 6C is an example of an embodiment of a user interface.

FIG. 6C shows an example interface 604 for the gaming application 110 resident on the user device 102. For example, the interface 604 may display play information such as a player name. Further, the interface 604 may display scoring information such as a score, a total score, a score to par, combinations thereof, and the like. For example, the interface 604 may display a scorecard or any other information related to the round of golf.

Figure 6D:
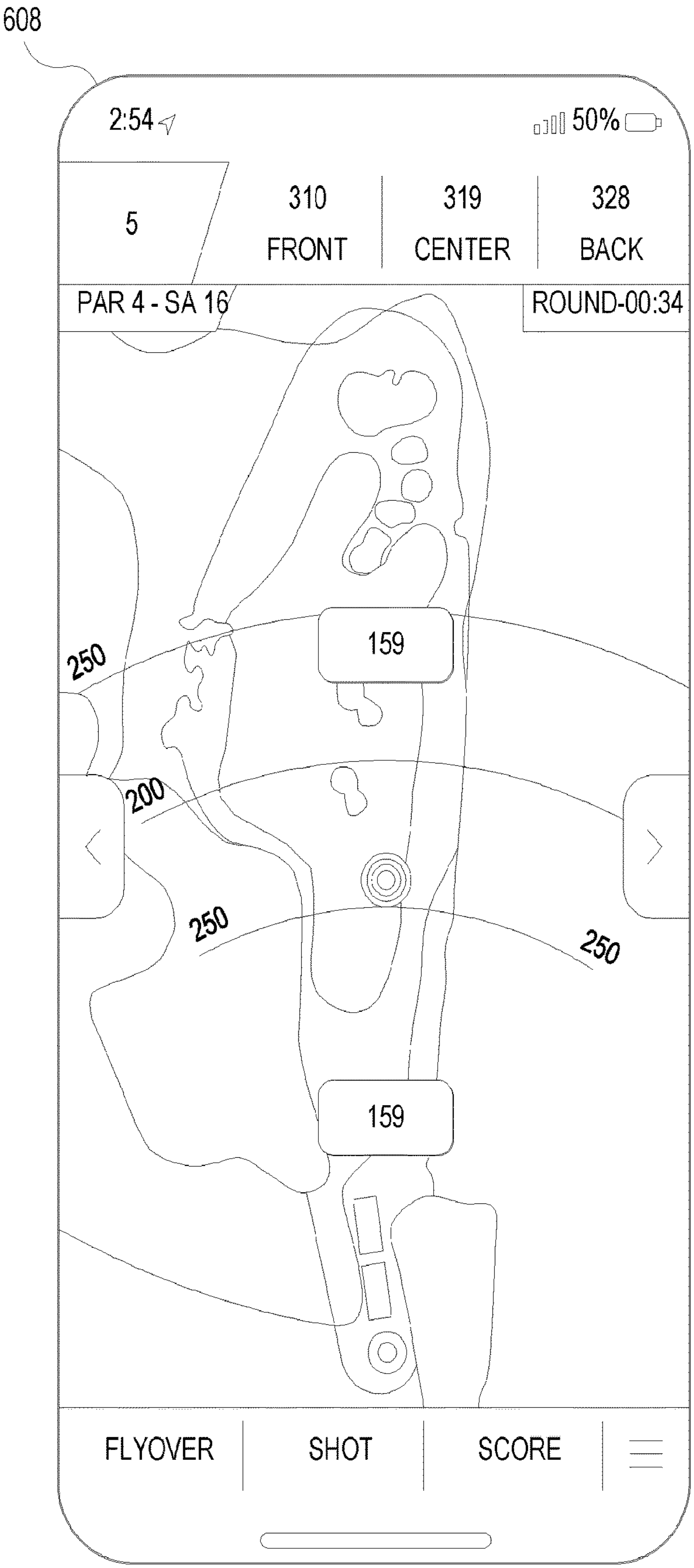
FIG. 6D is an example of an embodiment of a user interface.

FIG. 6D shows an example interface 606 for the gaming application 110 resident on the user device 102. For example, the interface 602 may display play information such as a hole layout, course layout, shot recommendations, yardages, hazards, or any other relevant information.

Figure 7A:
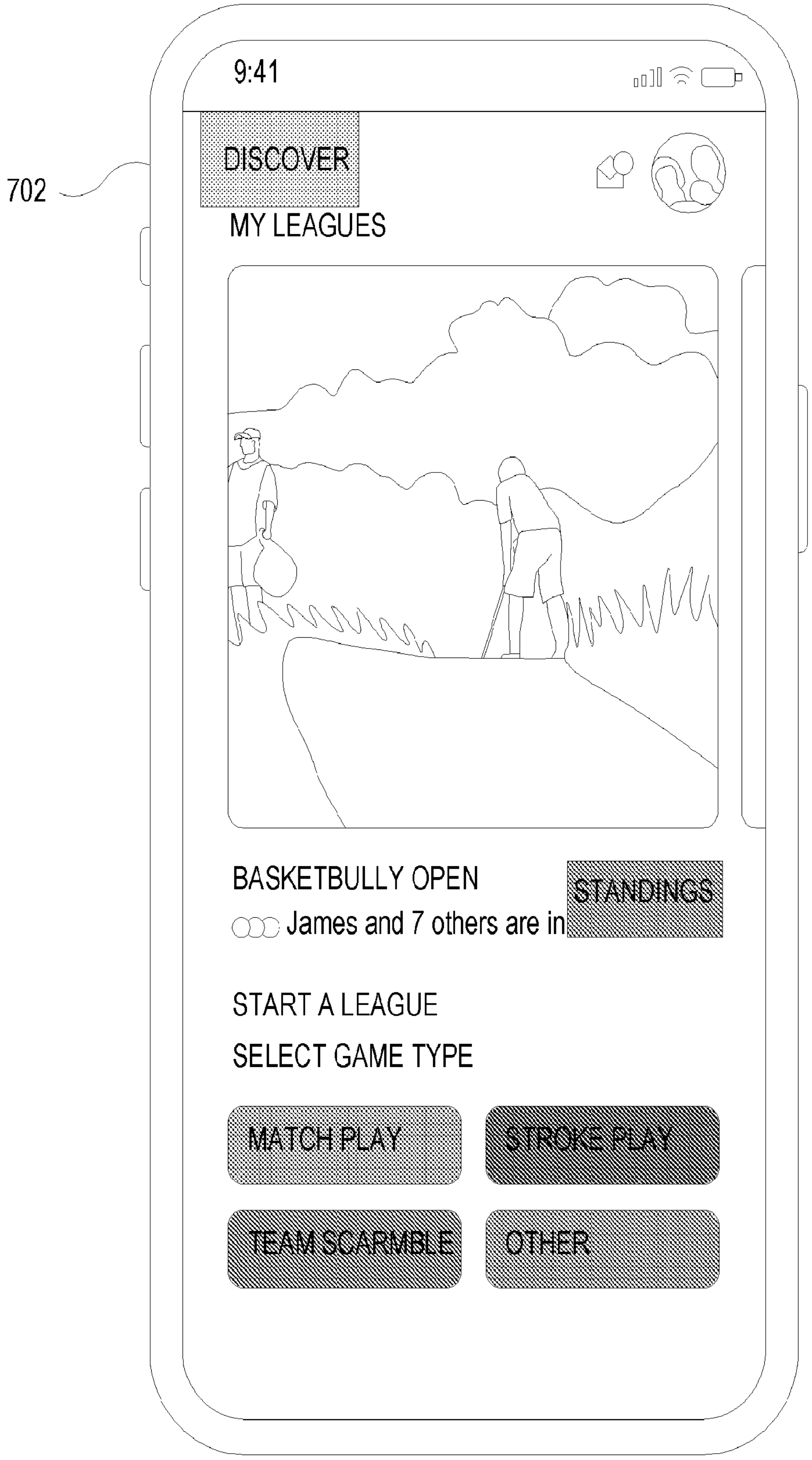
FIG. 7A is an example of an embodiment of a user interface.

FIG. 7A shows an example interface 702 for the gaming application 110 resident on the user device 102. For example, the interface 702 may display information such as a tournament or league name (e.g., "Basketbully Open." The interface 702 may display information related to standings. For example, the interface 702 may be configured to receive an input. For example, the interface 702 may display one or more selectable options. The one or more selectable options may be associated with, for example, one or more game modes. For example, the interface 702 may display the option to select "Match Play," "Strokes Play," "Team Scramble," "Other," combinations thereof and the like. The user interface 702 may, upon receiving the user input, enter into a particular game mode such as Match Play.

Figure 7B:
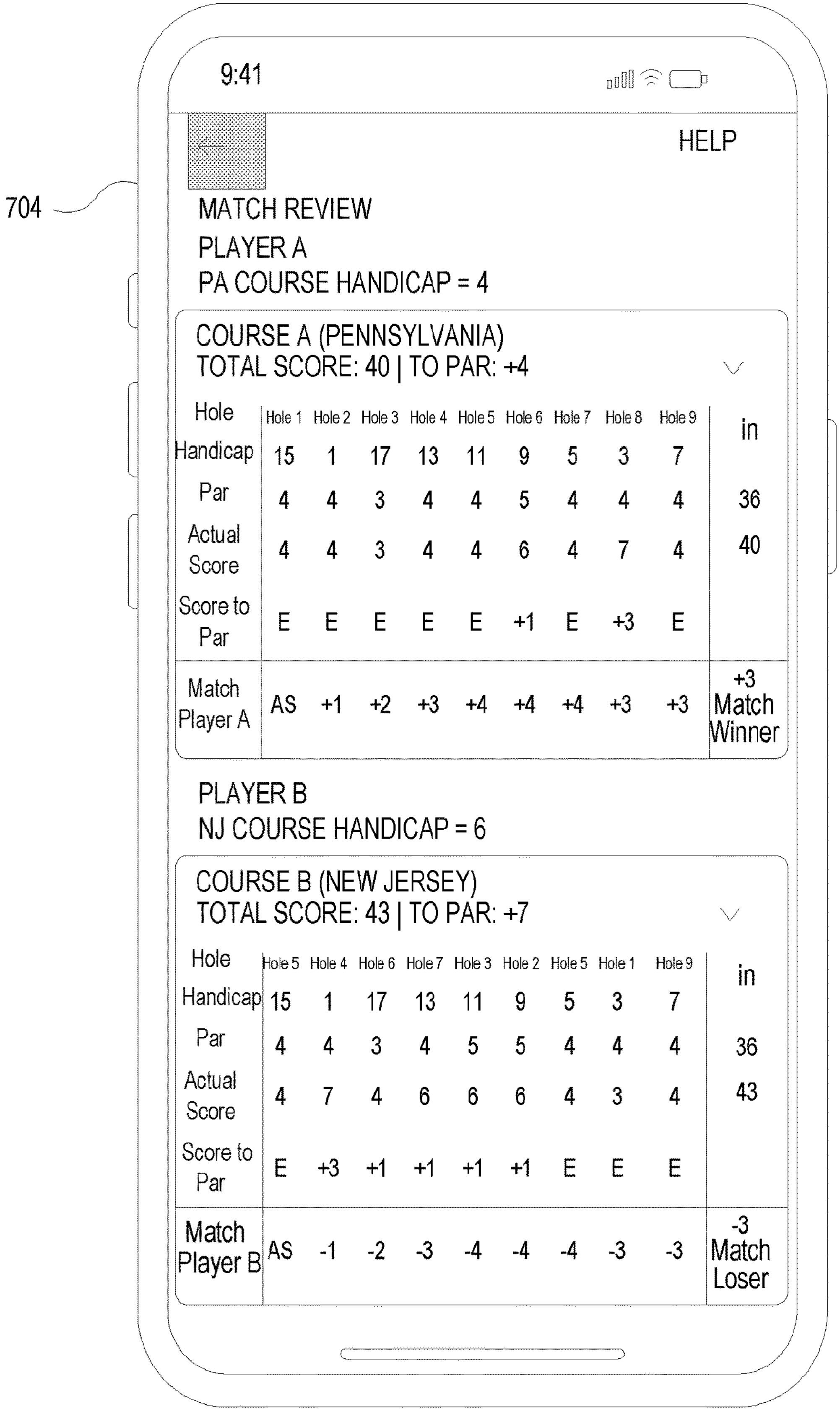
FIG. 7B is an example of an embodiment of a user interface.

FIG. 7B shows an example interface 704 for the gaming application 110 resident on the user device 102. For example, the interface 704 may display a "match review." The match review may comprise information related to game play associated with one or more players. For example, the match review may display strokes required for a given player (e.g., Player A), to complete a hole, or a round of golf. The interface 704 may comprise a version of a traditional scorecard because the holes are not matched in sequential order, but rather the hole handicaps are paired to match up.

Figure 7C:
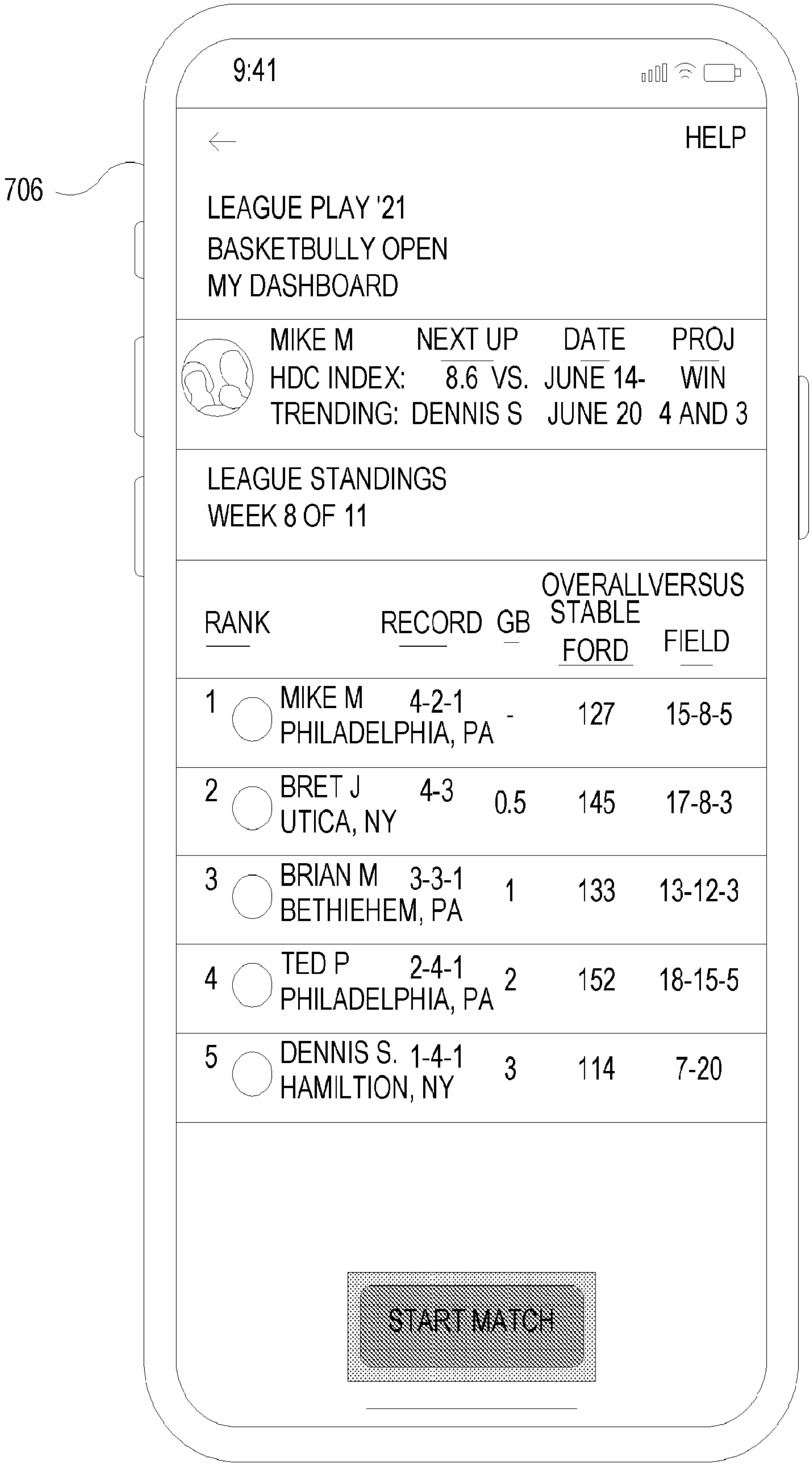
FIG. 7C is an example of an embodiment of a user interface.

FIG. 7C shows an example interface 706 for the gaming application 110 resident on the user device 102. For example, the interface 706 may be configured to display information associated with a league play game mode. For example, the interface 706 may be configured to display player statistics associated with one or more players. For example, the interface 706 may be configured to display historical information associated with one or more previous rounds of golf. The example interface 706 may also serve to rank the competitors based on the previous records and may offer projections of their future competitions.

Figure 7D:
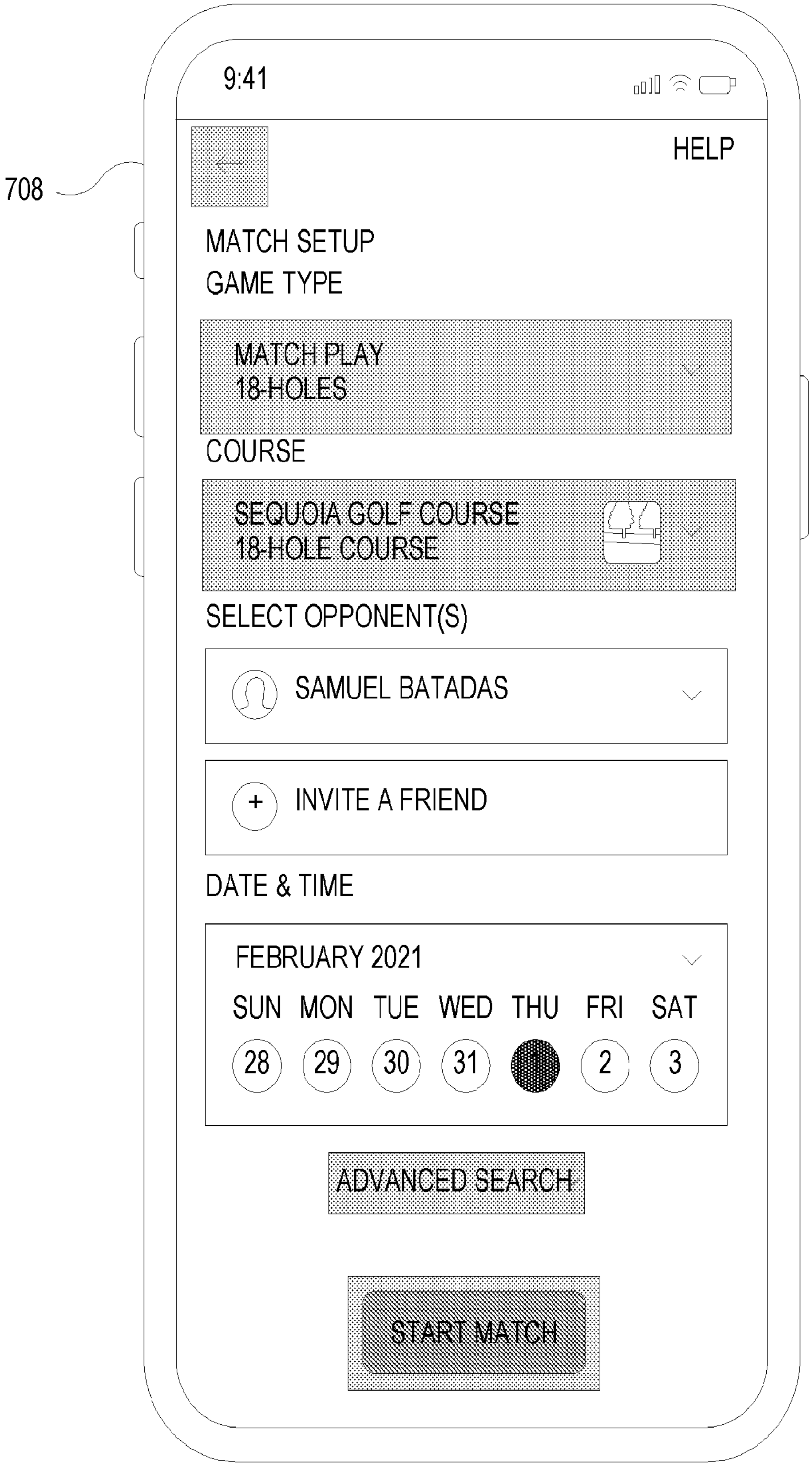
FIG. 7D is an example of an embodiment of a user interface.

FIG. 7D shows an example interface 708 for the gaming application 110 resident on the user device 102. For example, the interface 708 may display a match setup page. The match setup page may comprise selectable options. The interface 708 may be configured to receive a user input. For example, a user may select one of the selectable options. Receiving the user input may cause the gaming application to determine one or more game play parameters. For example, the one or more game play parameters may comprise a number of players, a game mode, which golf courses are being played, a course handicap for each participant, combinations thereof, and the like.

Figure 7E:
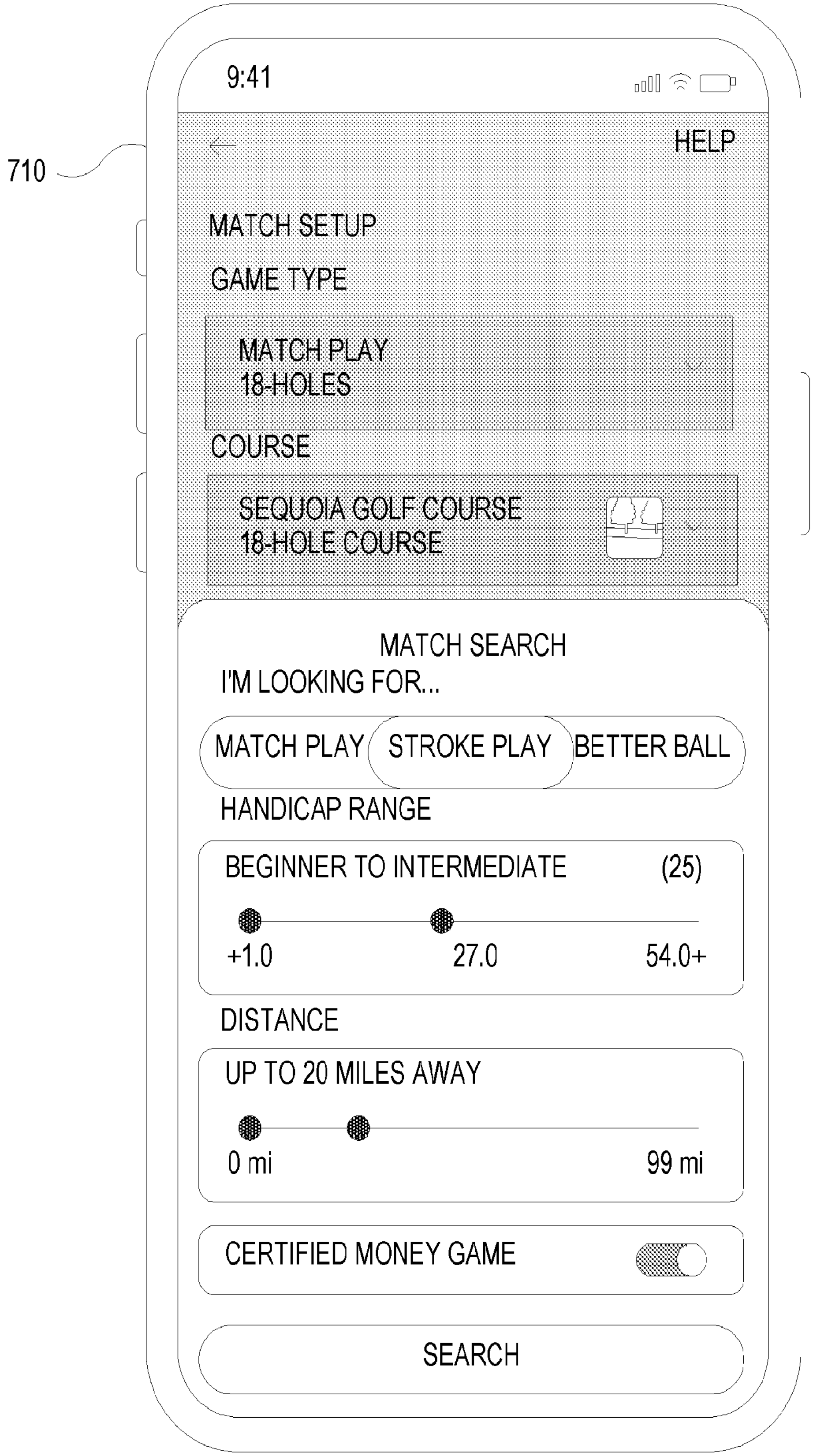
FIG. 7E is an example of an embodiment of a user interface.

FIG. 7E shows an example interface 710 for the gaming application 110 resident on the user device 102. This displays functionality for setting up public games or searching public competitions based on competitor skill set range (handicap index ranges), geographical distance parameters, types of games.

Figure 8:
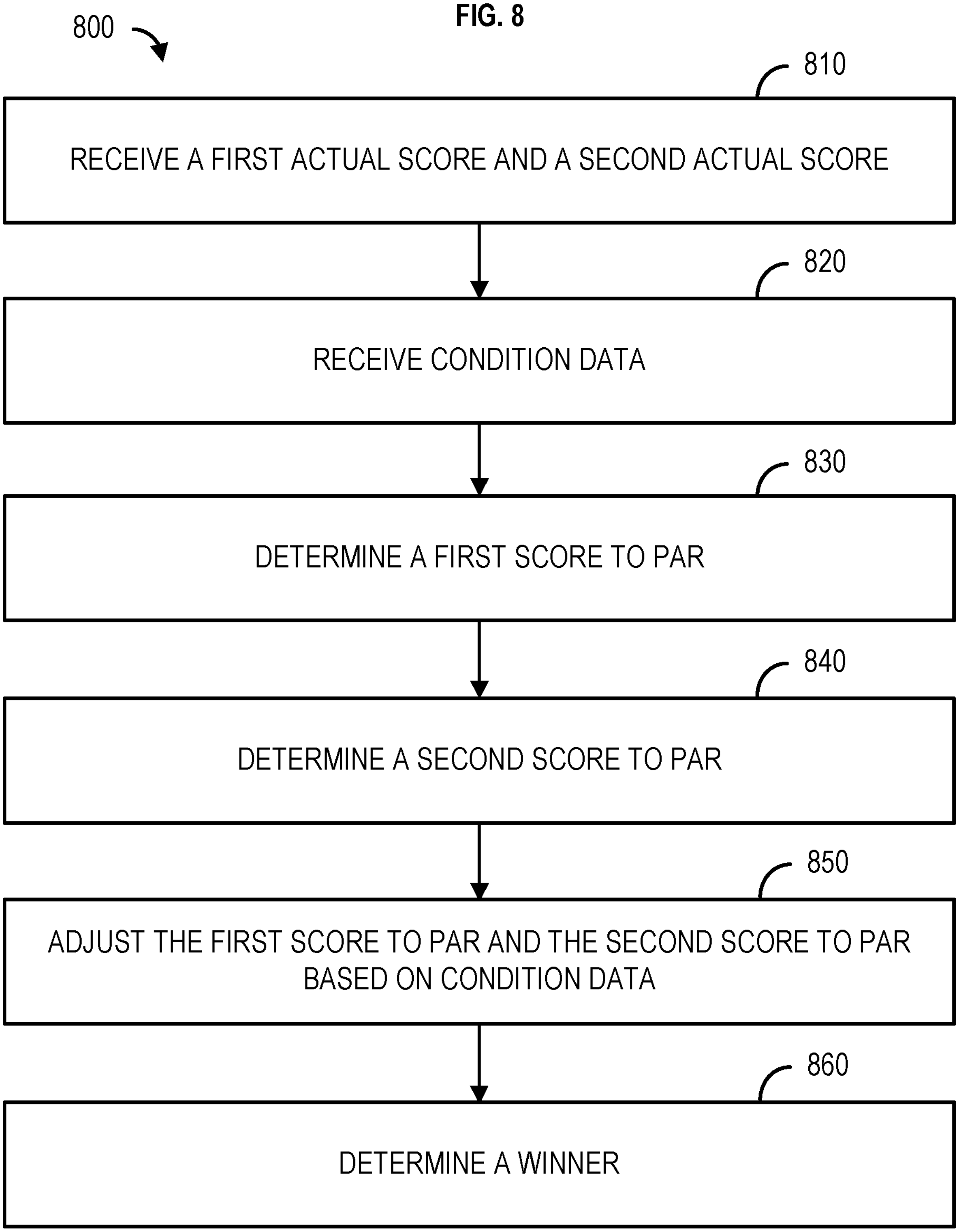
FIG. 8 is flowchart illustrating an example method.

FIG. 8 shows an example method 800. The example method 800 may be carried out (e.g., executed) by any one or more of the devices described herein including the gaming system 104, the user device 102 or the user device 103. At step 810, a first actual score associated with a first player and a second actual score associated with a second player may be received. The first actual score associated with the first player may be received by a computing device from a first user device associated with the first player. The second actual score associated with the second player may be received by the computing device from a second user device associated with the second player. For example, each of the first user device and the second user device may be configured to run one or more game applications as described herein. The first actual score and the second actual score may indicate the number of strokes required by each respective player to complete a round of golf on their respective courses. A first projected score and a second projected may also be received. The first projected score and the second projected score may reflect an adjusted anticipated score based on a player's handicap and the difficult of the course. The projected score may be an expected score and the different between the expected score and an adjusted actual score may be the handicap differential.

At 820, a first score to par associated with the first player may be determined. The first projected score associated with a first player on a first course may be determined. The first projected score may represent an expected score based on a course handicap, a hole handicap, a par rating, and/or a slope rating associated with the first course. The course handicap for an individual player takes into consideration those factors when displaying the course handicap number. Likewise, the second projected score may represent an expected score based on a handicap, a hole handicap, a par rating, and/or a slope rating associated with the second course. For example, the input may comprise the first projected score indicating how the player may expect to score on the course. Determining the first projected score may comprise retrieving the first projected score from a database, for instance, from a player profile. A first difference between the first actual score and the first projected score may comprise an adjusted score to par. The first difference may take into account the respective hole handicap associated with the first player and the corresponding hole handicap associated with the second player.

At 830, a second score to par associated with the second player may be determined. The second score to par associated with the second player may be determined based on a second project score. The second projected score may represent an expected score based on a handicap, a hole handicap, a par rating, and/or a slope rating associated with the first course. Determining the second projected score may comprise retrieving the second projected score from a database, for instance, from a player profile. Both the first projected score and the second projected score may be associated with a hole and/or a course. That is to say, the first player's projected score on a given hole with a first handicap rating (e.g., the hardest hole on the first course) may be used to compare to the second projected score which may be associated with a second hole that is associated with the same handicap rating (e.g., the first handicap rating indicating the hardest hole on the second course). A second difference between the second actual score and the second projected score associated with the second player) second difference between the second actual score and the second projected score may be determined. The second difference between the second actual score and the second projected score may comprise an adjusted score to par. The second difference may take into account the respective hole handicap associated with the first player and the corresponding hole handicap associated with the second player.

The first actual score may be indicative of the number of strokes a player took to complete a hole or round of golf. The first actual score may be received via a user device. Likewise, the second actual score may be indicative of the number of strokes a play took to complete a hole or round of golf. The second actual score may be received via a user device. In an embodiment, the first actual score and the second actual score may be retrieved from or received from a database. Both the first actual score and the second actual score may be associated with a hole. That is to say, the first player's actual score on a given hole with a first handicap rating (e.g., the hardest hole on the first course) may be used to compare to the second actual score which may be associated with a second hole that is associated with the same handicap rating (e.g., the first handicap rating indicating the hardest hole on the second course).

At 840, one or more condition data may be received. The one or more condition data may be received from any one or more of the devices described herein. The one or more condition data may comprise additional data about the conditions of play (e.g., course conditions, weather conditions, maintenance conditions, etc.) associated with one or more rounds of golf played by one or more of the first player or the second player. The one or more condition data may be determined (e.g., measured, gathered, generated, retrieved) by one or more sensing devices (e.g., sensors). The one or more sensing devise may comprise any kind of sensors such as temperature sensors, humidity sensors, precipitation sensors, UV index sensors, pressure sensors, soil sensors. The one or more condition data may be determined (e.g., measured, gathered, generated, retrieved) by the various sensing devices as described herein.

At 850, the first score the par and the second score to par may be adjusted based on the one or more condition data. For example, the one or more condition data may indicate conditions were very windy (e.g., greater than 10 mph) at the first course and very calm (e.g., 0 mph) at the second course. Accordingly, the first score to par may be adjusted to account for the increased difficulty due to the wind. For example, the first adjusted score to pay may be adjusted down one stroke (e.g., one fewer stroke, one stroke "better") while the second score to par may not be adjusted. However, the one or more condition data may indicate that there was no rain at the first course and there was an inch of rain at the second course. Accordingly, the second score to par may be adjusted down two strokes (e.g., two strokes fewer, two strokes better) to account for the increased difficulty of the course due to rain. Similarly, if there was maintenance on a given hole (e.g., greens were recently aerated, or some other maintenance or construction), it was particularly hot or cold at a given course, or any other like conditions, one or more of the first score to par and/or the second score to par may be adjusted accordingly.

At step 860, a winner may be determined based on a comparison of adjusted first score to par and the adjusted second score to par. Whichever player is associated with the lower adjusted score may be determined to be the winner.

The method 800 may further comprise sending one or more signals to the one or more user devices. For example, the one or more signals may be configured to cause one or more outputs on the one or more user devices. For example, the one or more signals may be configured to cause an output of a winner indication configured to indicate the winner of the contest. The method may further comprise receiving an indication of a game mode. For example, the game mode may comprise at least one of: match play, stroke play, skins, stableford, multiplayer games, scramble, better ball, or league play. The method 800 may further comprise displaying the first difference and the second difference. The method 800 may further comprise receiving first environmental information associated with a first location, receiving second environmental information associated with a second location, and adjusting, based on the first environmental information associated with the first location and the second environmental information associated with the second location, the first projected score and the second projected score.

Figure 9:
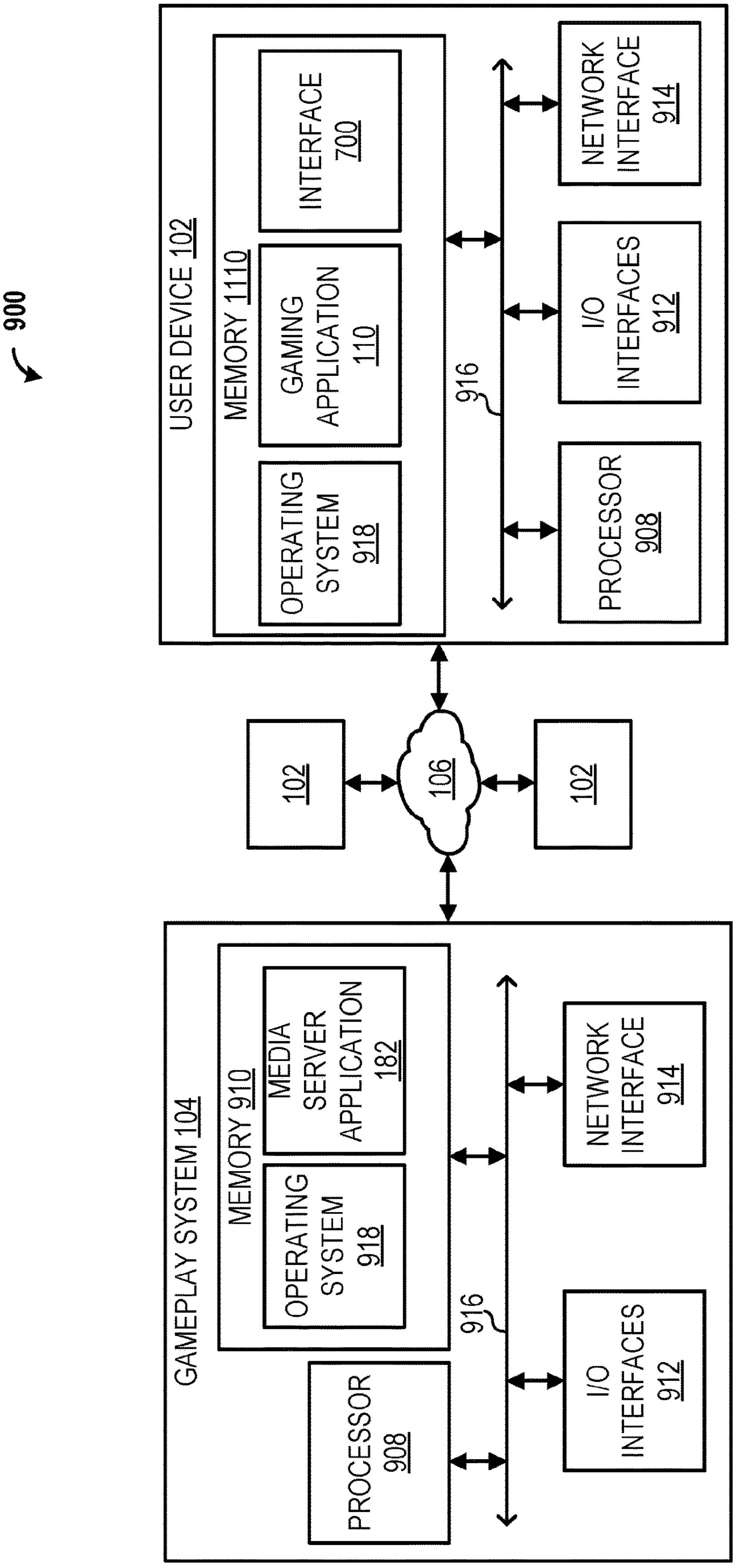
FIG. 9 is an example of an environment in which the present systems and methods may operate.

FIG. 9 is a block diagram depicting an environment 900 comprising non-limiting examples of the computing device 104 and the user device 102 connected through the network 106. In an aspect, some or all steps of any described method may be performed on a computing device as described herein. The computing device 104 can comprise one or multiple computers configured to store one or more of the gameplay application 182, the game items 214, the game metadata 216, the playlists 218, the gaming engine 108, and the like. The user device 102 can comprise one or more computers configured to store one or more of the gaming application 110 and to operate the user interface (e.g., via a web browser) such as, for example, a mobile phone, a tablet computer, a laptop computer, or a desktop computer. Multiple user devices 102 can connect to the computing device 104 through the network 106 such as, for example, the Internet. A user on a user device 102 may connect to the gameplay application 182 with the user interface 800. In an aspect, one or more of the gameplay application 182, the game items 214, the game metadata 216, the playlists 218, and/or the gaming engine 108 may be resident on the user device 102.

The computing device 104 and the user device 102 can be a digital computer that, in terms of hardware architecture, generally includes a processor 908, memory system 910, input/output (I/O) interfaces 912, and network interfaces 914. These components (908, 910, 912, and 914) are communicatively coupled via a local interface 916. The local interface 916 can be, for example but not limited to, one or more buses or other wired or wireless connections, as is known in the art. The local interface 916 can have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 908 can be a hardware device for executing software, particularly that stored in memory system 910. The processor 908 can be any custom made or commercially available processor, a central processing unit (CPU), an auxiliary processor among several processors associated with the computing device 104 and the user device 102, a semiconductor-based microprocessor (in the form of a microchip or chip set), or generally any device for executing software instructions. When the computing device 104 and the user device 102 is in operation, the processor 908 can be configured to execute software stored within the memory system 910, to communicate data to and from the memory system 910, and to generally control operations of the computing device 104 and the user device 102 pursuant to the software.

The I/O interfaces 912 can be used to receive user input from and/or for providing system output to one or more devices or components. User input can be provided via, for example, a keyboard and/or a mouse. System output can be provided via a display device and a printer (not shown). I/O interfaces 912 can include, for example, a serial port, a parallel port, a Small Computer System Interface (SCSI), an IR interface, an RF interface, and/or a universal serial bus (USB) interface.

The network interface 914 can be used to transmit and receive from the computing device 104 or the user device 102 on the network 106. The network interface 814 may include, for example, a 10BaseT Ethernet Adaptor, a 100BaseT Ethernet Adaptor, a LAN PHY Ethernet Adaptor, a Token Ring Adaptor, a wireless network adapter (e.g., WiFi), or any other suitable network interface device. The network interface 914 may include address, control, and/or data connections to enable appropriate communications on the network 904.

The memory system 910 can include any one or combination of volatile memory elements (e.g., random access memory (RAM, such as DRAM, SRAM, SDRAM, etc.)) and nonvolatile memory elements (e.g., ROM, hard drive, tape, CDROM, DVDROM, etc.). Moreover, the memory system 910 may incorporate electronic, magnetic, optical, and/or other types of storage media. Note that the memory system 910 can have a distributed architecture, where various components are situated remote from one another, but can be accessed by the processor 908.

The software in memory system 910 may include one or more software programs, each of which comprises an ordered listing of executable instructions for implementing logical functions. In the example of FIG. 9, the software in the memory system 910 of the computing device 104 can comprise the gameplay application 182 (or subcomponents thereof) and a suitable operating system (O/S) 918. In the example of FIG. 9, the software in the memory system 710 of the user device 102 can comprise the user interface, the gaming application 110, and a suitable operating system (O/S) 918. The operating system 918 essentially controls the execution of other computer programs, such as the operating system 918, the gameplay application 182, the gaming application 110, and/or the user interface 900, and provides scheduling, input-output control, file and data management, memory management, and communication control and related services.

For purposes of illustration, application programs and other executable program components such as the operating system 918 are illustrated herein as discrete blocks, although it is recognized that such programs and components can reside at various times in different storage components of the computing device 104 and/or the user device 102. An implementation of the gameplay application 182, the gaming application 110, and/or the user interface 900 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" can comprise volatile and non-volatile, removable and non-removable media implemented in any methods or technology for storage of information such as computer readable instructions, data structures, program modules, or other data. Exemplary computer storage media can comprise RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:

receiving, from one or more user devices, a first actual score and a first projected score associated with a first player on a first course and a second actual score and a second projected score associated with a second player on a second course;

receiving, from one or more environmental sensors at one or more of the first course or the second course, one or more condition data associated with one or more of the first course and the second course, wherein the one or more environmental sensors comprise one or more of: one or more wind sensors, one or more temperature sensors, or one or more precipitation sensors;

determining, based on the first actual score and the first projected score, a first score to par associated with the first player;

determining, based on the second actual score and the second projected score, a second score to par associated with the second player;

adjusting, based on the one or more condition data, the first score to par and the second score to par; and determining, based on the adjusted first score to par and the adjusted second score to par, a winner.

2. The method of claim 1, wherein the first projected score comprises at least one of: a projected score to par or a golf handicap, and wherein the second projected score comprises at least one of: a projected score to par or a golf handicap.

3. The method of claim 1, wherein receiving the first actual score associated with the first player on the first course and the second actual score associated with the second player on the second course comprises receiving the first actual score via a first remote computing device associated with a first location and further comprises receiving the second actual score via a second remote computing device associated with a second location.

4. The method of claim 1, further comprising receiving an indication of a game mode.

5. The method of claim 4, wherein the game mode comprises at least one of: match play, stroke play, skins, stableford, multiplayer games, scramble, better ball, or league play.

6. The method of claim 1, further comprising displaying the adjusted first score to par and the adjusted second score to par.

7. The method of claim 1, further comprising:

receiving first environmental information associated with a first location;

receiving second environmental information associated with a second location; and adjusting, based on the first environmental information associated with the first location and the second environmental information associated with the second location, the first projected score and the second projected score.

8. An apparatus comprising:

one or more processors; and memory storing processor executable instructions that, when executed by the one or more processors, cause the apparatus to:

receive a first actual score and a first projected score associated with a first player on a first course and a second actual score and a second projected score associated with a second player on a second course;

receive, from one or more environmental sensors at one or more of the first course or the second course, one or more condition data associated with one or more of the first course and the second course, wherein the one or more environmental sensors comprise one or more of: one or more wind sensors, one or more temperature sensors, or one or more precipitation sensors;

determine, based on the first actual score and the first projected score, a first score to par associated with the first player;

determine, based on the second actual score and the second projected score, a second score to par associated with the second player;

adjust, based on the one or more condition data, the first score to par and the second score to par; and determine, based on the adjusted first score to par and the adjusted second score to par, a winner.

9. The apparatus of claim 8, wherein the first projected score comprises at least one of: a projected score to par or a golf handicap.

10. The apparatus of claim 8, wherein the second projected score comprises at least one of: a projected score to par or a golf handicap.

11. The apparatus of claim 8, wherein the processor executable instructions that, when executed by the one or more processors, cause the apparatus to receive the first actual score associated with the first player on the first course and the second actual score associated with the second player on the second course, cause the apparatus to receive the first actual score and the second actual score via a first remote computing device associated with a first player at a first location and further cause the apparatus to receive the second actual score via a second remote computing device associated with a second player at a second location.

12. The apparatus of claim 8, wherein the processor executable instructions, when executed by the one or more processors, further cause the apparatus to receive an indication of a game mode.

13. The apparatus of claim 12, wherein the game mode comprises at least one of: match play, stroke play, skins, stableford, multiplayer games, scramble, better ball, or league play.

14. The apparatus of claim 8, wherein the processor executable instructions, when executed by the one or more processors, further cause the apparatus to display the first score to par and the second score to par.

15. A system comprising:

a first computing device configured to:

receive a first actual score and a first projected score associated with a first player on a first course and a second actual score and a second projected score associated with a second player on a second course;

receive, from one or more environmental sensors at one or more of the first course or the second course, one or more condition data associated with one or more of the first course and the second course, wherein the one or more environmental sensors comprise one or more of: one or more wind sensors, one or more temperature sensors, or one or more precipitation sensors;

determine, based on the first actual score and the first projected score, a first score to par associated with the first player;

determine, based on the second actual score and the second projected score, a second score to par associated with the second player;

adjust, based on the one or more condition data, the first score to par and the second score to par; and determine, based on the adjusted first score to par and the adjusted second score to par, a winner;

a first user device configured to:

receive the first actual score associated with the first player on the first course; and a second user device configured to:

receive the second actual score associated with the second player on the second course.

16. The system of claim 15, wherein the first projected score comprises at least one of: a projected score to par or a golf handicap.

17. The system of claim 15, wherein the second projected score comprises at least one of: a projected score to par or a golf handicap.

18. The system of claim 17, wherein the first computing device is configured to receive the first actual score associated with the first player on the first course and the second actual score associated with the second player on the second course by receiving the first actual score via a first remote computing device associated with a first location and the second actual score via a second remote computing device associated with a second location.

19. The system of claim 15, wherein the first computing device is further configured to receive an indication of a game mode.

20. The system of claim 19, wherein the game mode comprises at least one of: match play, stroke play, skins, stableford, multiplayer games, scramble, better ball, or league play.

* * * * *